United States Patent
Srinivasan et al.

(10) Patent No.: US 7,590,647 B2
(45) Date of Patent: Sep. 15, 2009

(54) METHOD FOR EXTRACTING, INTERPRETING AND STANDARDIZING TABULAR DATA FROM UNSTRUCTURED DOCUMENTS

(75) Inventors: Venkatesan Srinivasan, Weston, MA (US); Mahantesh Kothiwale, Mansfield, MA (US); Rummana Alam, Walpole, MA (US); Srinivasan Bharadwaj, Sharon, MA (US)

(73) Assignee: Rage Frameworks, Inc, Westwood, MA (US)

( * ) Notice: Subject to any disclaimer, the term of this patent is extended or adjusted under 35 U.S.C. 154(b) by 153 days.

(21) Appl. No.: 11/140,340

(22) Filed: May 27, 2005

(65) Prior Publication Data

US 2006/0288268 A1 Dec. 21, 2006

(51) Int. Cl.
G06F 7/00 (2006.01)
G06F 9/44 (2006.01)
G06F 3/00 (2006.01)
(52) U.S. Cl. ........................ 707/102; 717/108; 715/708
(58) Field of Classification Search ................ 715/500; 707/101, 1, 102, 104.1, 2, 3; 709/246, 247
See application file for complete search history.

(56) References Cited

U.S. PATENT DOCUMENTS

| | | | |
|---|---|---|---|
| 6,236,994 B1 * | 5/2001 | Swartz et al. ................... 707/6 |
| 6,247,018 B1 * | 6/2001 | Rheaume ..................... 707/102 |
| 6,336,094 B1 | 1/2002 | Ferguson et al. |
| 6,714,941 B1 | 3/2004 | Lerman et al. |
| 6,834,276 B1 * | 12/2004 | Jensen et al. ................... 707/2 |
| 6,931,397 B1 * | 8/2005 | Sundaresan ..................... 707/5 |
| 6,996,575 B2 * | 2/2006 | Cox et al. .................... 707/102 |
| 7,007,105 B1 * | 2/2006 | Sullivan et al. ............. 709/247 |
| 7,139,757 B1 * | 11/2006 | Apollonsky et al. ............. 707/7 |
| 7,251,777 B1 * | 7/2007 | Valtchev et al. .............. 715/234 |
| 7,272,594 B1 * | 9/2007 | Lynch et al. .................... 707/3 |
| 7,350,191 B1 * | 3/2008 | Kompella et al. ........... 717/108 |
| 2002/0194379 A1 * | 12/2002 | Bennett et al. .............. 709/246 |
| 2003/0167253 A1 * | 9/2003 | Meinig .......................... 707/1 |
| 2003/0225749 A1 * | 12/2003 | Cox et al. ....................... 707/3 |
| 2003/0227487 A1 * | 12/2003 | Hugh ......................... 345/777 |
| 2004/0088283 A1 * | 5/2004 | Lissar et al. .................... 707/3 |
| 2004/0093259 A1 * | 5/2004 | Pych ............................ 705/10 |
| 2004/0143588 A1 * | 7/2004 | Russell ....................... 707/100 |
| 2004/0193520 A1 * | 9/2004 | LaComb et al. ............... 705/35 |
| 2004/0194009 A1 * | 9/2004 | LaComb et al. ............. 715/500 |

(Continued)

OTHER PUBLICATIONS

"Automatic Migration of Files into Relational Databases", by Uwe Hohenstein and Andreas Ebert, ACM Press, Nov. 1999, Proceedings of the 2nd international workshop on Web information and data management WIDM '99, pp. 17-21.*

(Continued)

*Primary Examiner*—Christian P. Chace
*Assistant Examiner*—Tarek Chbouki
(74) *Attorney, Agent, or Firm*—William L. Botjer

(57) ABSTRACT

A system, method, and computer program for automatically identifying, parsing, and interpreting tabular data from unstructured documents stored in various formats such as ASCII text, Unicode text, HTML, PDF text, and PDF image format is provided. A set of table identification, parsing/tokenizing, and interpreting/mapping rules are developed with grammar descriptors. These rules are then applied to a set of documents to identify a table, parse the content of the table, and interpret the parsed content, if required, thereby standardizing the tabular data.

14 Claims, 17 Drawing Sheets

U.S. PATENT DOCUMENTS

| | | | |
|---|---|---|---|
| 2005/0125743 A1* | 6/2005 | Beaton et al. | 715/811 |
| 2005/0158767 A1* | 7/2005 | Haskell et al. | 435/6 |
| 2005/0165600 A1* | 7/2005 | Kasravi et al. | 704/9 |
| 2005/0177805 A1* | 8/2005 | Lynch et al. | 715/968 |
| 2005/0234740 A1* | 10/2005 | Krishnan et al. | 705/2 |
| 2005/0289182 A1* | 12/2005 | Pandian et al. | 707/104.1 |
| 2006/0242180 A1* | 10/2006 | Graf et al. | 707/101 |
| 2006/0288285 A1* | 12/2006 | Lai et al. | 715/708 |

OTHER PUBLICATIONS

"Document Databases: Bridging XML-schema and relational databases: a system for generating and manipulating relational databases using valid XML documents", by Iraklis Varlamis and Michalis Vazirgiannis, ACM Press, Nov. 2001, Proceedings of the 2001 ACM symposium on Document engineering DocEng '01.*

* cited by examiner

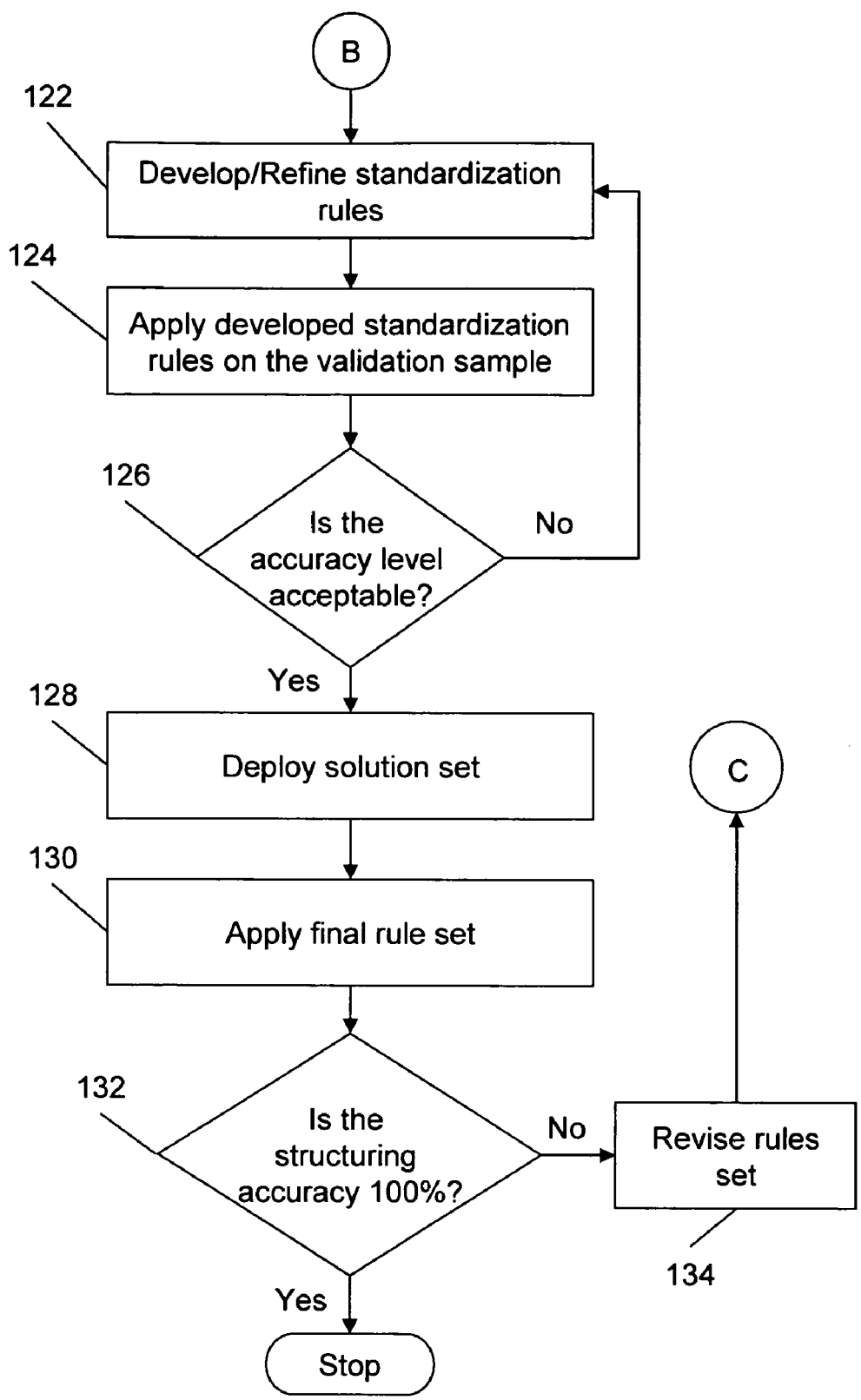
FIG. 1(Continue)

Extracted data columns

| As Reported Label | As Reported Value 1 | As Reported Value 2 | As Reported Value 3 | As Reported Value 4 |
|---|---|---|---|---|
| STATEMENT YEAR | 2003 | 2002 | | |
| STATEMENT MONTH | JUNE | DECEMBER | | |
| STATEMENT DATE | 29 | 31 | | |
| STATEMENT PERIOD | | | | |
| STATEMENT UNITS | Millions | Millions | | |
| CONSOLIDATED BALANCE SHEET | | | | |
| The Black & Decker Corporation and Subsidiaries | | | | |
| (DollarsinMillionsExceptPerShareAmount) | | | | |
| June 29, | | | | |
| | 2003 | | | |
| December 31, (Unaudited) | 2002 | | | |
| Cash and cash equivalents | $156.6 | $517.1 | | |
| Trade receivables | 820.7 | 729.0 | | |
| Inventories | 768.1 | 749.9 | | |

FIG. 4

Extracted data columns

| As Reported Label | As Reported Value 1 | As Reported Value 2 | As Reported Value 3 | As Reported Value 4 |
|---|---|---|---|---|
| STATEMENT YEAR | 2003 | 2002 | | |
| STATEMENT MONTH | JUNE | JUNE | | |
| STATEMENT DATE | 29 | 30 | | |
| STATEMENT PERIOD | 6 | 6 | | |
| STATEMENT UNITS | Millions | Millions | | |
| CONSOLIDATED STATEMENT OF CASH FLOWS (Unaudited) | | | | |
| The Black & Decker Corporation and Subsidiaries | | | | |
| (Dollars in Millions) | | | | |
| Six Months Ended | | | | |
| June 29, | | | | |
| June 30, | | | | |
| | 2003 | 2002 | | |
| Operating Activities | | | | |
| Net earnings | $119.1 | $99.1 | | |
| Adjustments to reconcile net earnings to cash flow from operating activities: Non-cash charges and credits: | | | | |
| Depreciation and amortization | 72.7 | 64.8 | | |
| Other | 3.2 | 1.6 | | |

FIG. 6

| Extracted Item | | Interpreted Item | | | | |
|---|---|---|---|---|---|---|
| Cash and cash equivalents | CASH AND CASH EQUIVALENTS | CASH AND CASH EQUIVALENTS | | $ 156.6 | $ 156.6 | $517.1 |
| Trade receivables | TRADE RECEIVABLES, NET | TRADE RECEIVABLES, NET | | 820.7 | 820.7 | 729.0 |
| Inventories | TOTAL INVENTORIES | TOTAL INVENTORIES | | 768.1 | 768.1 | 749.9 |
| Other current assets | OTHER CURRENT ASSETS | OTHER CURRENT ASSETS | | 215.0 | 215.0 | 198.9 |
| Total Current Assets | TOTAL CURRENT ASSETS | TOTAL CURRENT ASSETS | | 1,960.4 | 1,960.4 | 2,193.9 |
| Property, Plant, and Equipment | PROPERTY, PLANT AND EQUIPMENT, NET | PROPERTY, PLANT AND EQUIPMENT, NET | | 638.6 | 638.6 | 655.9 |
| Goodwill | GOODWILL | GOODWILL | | 749.6 | 749.6 | 729.1 |
| Other Assets | OTHER LONG TERM ASSETS | OTHER LONG TERM ASSETS | | 560.9 | 560.9 | 551.6 |
| | TOTAL ASSETS | TOTAL ASSETS | | $3,909.6 | $3,909.5 | $4,130.5 |
| Liabilities and Stockholders Equity | NULL | | | | | null |
| Short-term borrowings | CURRENT PORTION OF DEBT | CURRENT PORTION OF DEBT | | $ 87.0 | $ 87.0 | $ 4.6 |
| Current maturities of long-term debt | CURRENT PORTION OF DEBT | CURRENT PORTION OF DEBT | | .4 | .4 | 312.0 |
| Trade accounts payable | ACCOUNTS PAYABLE, TRADE | ACCOUNTS PAYABLE, TRADE | | 316.3 | 316.3 | 343.2 |
| Other accrued liabilities | OTHER CURRENT LIABILITIES | OTHER CURRENT LIABILITIES | | 762.1 | 762.1 | 793.5 |
| Total Current Liabilities | TOTAL CURRENT LIABILITIES | TOTAL CURRENT LIABILITIES | | 1,165.8 | 1,165.8 | 1,453.4 |

FIG. 7

| | Extracted Item | Interpreted Item | | | |
|---|---|---|---|---|---|
| (DollarsinMillionsExceptPerShareAmounts) | NULL | | | | |
| Three Months Ended | NULL | | | | |
| Six Months Ended | NULL | | | | |
| Sales | NET SALES | TOTAL REVENUE | | $1,119.7 | $1,119.7 |
| Cost of goods sold | COST OF REVENUE | COST OF REVENUE | | 720.0 | 720.0 |
| Selling, general, and administrative expenses | SELLING, GENERAL AND ADMINISTRATIVE EXPENSES | SELLING, GENERAL AND ADMINISTRATIVE EXPENSES | | 287.8 | 287.8 |
| Operating Income | OPERATING INCOME | OPERATING INCOME | | 111.9 | 111.9 |
| Interest expense (net of interest income) | INTEREST EXPENSE | INTEREST EXPENSE | | 7.7 | 7.7 |
| Other expense | OTHER NON OPERATING EXPENSE/INCOME | OTHER NON OPERATING EXPENSE/INCOME | | .5 | .5 |
| Earnings Before Income Taxes | INCOME BEFORE TAXES | INCOME BEFORE TAXES | | 103.7 | 103.7 |
| Income taxes | INCOME TAXES | INCOME TAXES | | 28.0 | 28.0 |
| Net Earnings | NET INCOME | NET INCOME | | $75.7 | $75.7 |
| Net Earnings Per Common Share - Basic | BASIC EARNINGS PER SHARE | BASIC EARNINGS PER SHARE | | $.98 | $.98 |
| Shares Used in Computing Basic Earnings Per Share (in Millions) | BASIC WEIGHTED AVERAGE SHARES OUTSTANDING | BASIC WEIGHTED AVERAGE SHARES OUTSTANDING | | 77.6 | 77.6 |
| Net Earnings Per Common Share - Assuming Dilution | DILUTED EARNINGS PER SHARE | DILUTED EARNINGS PER SHARE | | $.97 | $.97 |

FIG. 8

| | Extracted Item | Interpreted Item | | | | |
|---|---|---|---|---|---|---|
| Depreciation and amortization | DEPRECIATION | DEPRECIATION | 72.7 | 72.7 | 64.8 | 64.8 |
| Other | OTHER CASHFLOW FROM OPERATING ACTIVITIES | OTHER CASHFLOW FROM OPERATING ACTIVITIES | 3.2 | 3.2 | 1.6 | 1.6 |
| Changes in selected working capital items: | NULL | | | | | |
| Trade receivables | CHANGES IN ACCOUNTS RECEIVABLE | CHANGES IN ACCOUNTS RECEIVABLE | (57.7) | (57.7) | (95.3) | (95.3) |
| Inventories | CHANGES IN INVENTORIES | CHANGES IN INVENTORIES | 13.0 | 13.0 | 28.5 | 28.5 |
| Trade accounts payable | CHANGES IN ACCOUNTS PAYABLE | CHANGES IN ACCOUNTS PAYABLE | (35.1) | (35.1) | 61.9 | 61.9 |
| Restructuring spending | OTHER NON-CASH CHARGES | OTHER NON-CASH CHARGES | (23.5) | (23.5) | (14.5) | (14.5) |
| Other assets and liabilities | OTHER CASHFLOW FROM OPERATING ACTIVITIES | OTHER CASHFLOW FROM OPERATING ACTIVITIES | (91.1) | (91.1) | 16.5 | 16.5 |
| Cash Flow From Operating Activities | TOTAL CASHFLOW FROM OPERATING ACTIVITIES | TOTAL CASHFLOW FROM OPERATING ACTIVITIES | .6 | .6 | 162.6 | 162.6 |
| Investing Activities | NULL | | | | | |
| Proceeds from disposal of assets | CAPITAL EXPENDITURE | CAPITAL EXPENDITURE | 4.9 | 4.9 | 3.7 | 3.7 |
| Capital expenditures | CAPITAL EXPENDITURE | CAPITAL EXPENDITURE | (51.6) | (51.6) | (48.9) | (48.9) |
| Other investing activities | OTHER CASHFLOW FROM INVESTING ACTIVITIES | OTHER CASHFLOW FROM INVESTING ACTIVITIES | (1.2) | (1.2) | - | |
| Cash Flow From Investing Activities | TOTAL CASHFLOW FROM INVESTING ACTIVITIES | TOTAL CASHFLOW FROM INVESTING ACTIVITIES | (47.9) | (47.9) | (45.2) | (45.2) |
| Financing Activities | NULL | | | | | |

FIG. 9

Standardized data columns

BLACK & DECKER CORP

Normalized Annual Statement

Income Statement     Balance Sheet     Cashflow Statement

| Balance Sheet | 12/31/2002 | 06/29/2003 |
|---|---|---|
| Statement Units | Millions | Millions |
| Current Assets: | | |
| Cash & Cash Equivalents | 517.10 | 156.60 |
| Short Term Investments | 0.00 | 0.00 |
| Trade Receivables, Net | 729.00 | 820.70 |
| Other Receivables | 0.00 | 0.00 |
| Inventories: | | |
|    Raw Materials | 0.00 | 0.00 |
|    Work-in-Process | 0.00 | 0.00 |
|    Finished Goods | 0.00 | 0.00 |
|    Total Inventories | 748.90 | 768.10 |
| Prepaid Expenses | 0.00 | 0.00 |
| Other Current Assets | 198.90 | 215.00 |
| Total Current Assets | 2,193.90 | 1,960.40 |

FIG. 10

Standardized data columns

BLACK & DECKER CORP  Normalized Statement

Income Statement    Balance Sheet    CashFlow Statement

| Income Statement | 06/30/2002 | 06/29/2003 | 06/30/2002 | 06/29/2003 |
|---|---|---|---|---|
| Statement Period | 6 | 6 | 3 | 3 |
| Statement Units | Millions | Millions | Millions | Millions |
| Revenues: | | | | |
| Net Sales | 2,077.00 | 2,087.90 | 1,125.30 | 1,119.70 |
| Other Revenue | 0.00 | 0.00 | 0.00 | 0.00 |
| Total Revenue | 2,077.00 | 2,087.90 | 1,125.30 | 1,119.70 |
| Cost of Revenue | 1,391.60 | 1,344.70 | 746.80 | 720.00 |
| Gross Profit | 685.40 | 743.20 | 378.50 | 399.70 |
| Operating Expenses: | | | | |
| Selling, General & Admin Expenses | 515.70 | 558.00 | 271.00 | 287.90 |
| Asset Write Down | 0.00 | 0.00 | 0.00 | 0.00 |
| Research and Development | 0.00 | 0.00 | 0.00 | 0.00 |
| Depreciation & Amortization | 0.00 | 0.00 | 0.00 | 0.00 |
| Non Recurring Expense/(Income) | 0.00 | 0.00 | 0.00 | 0.00 |

FIG. 11

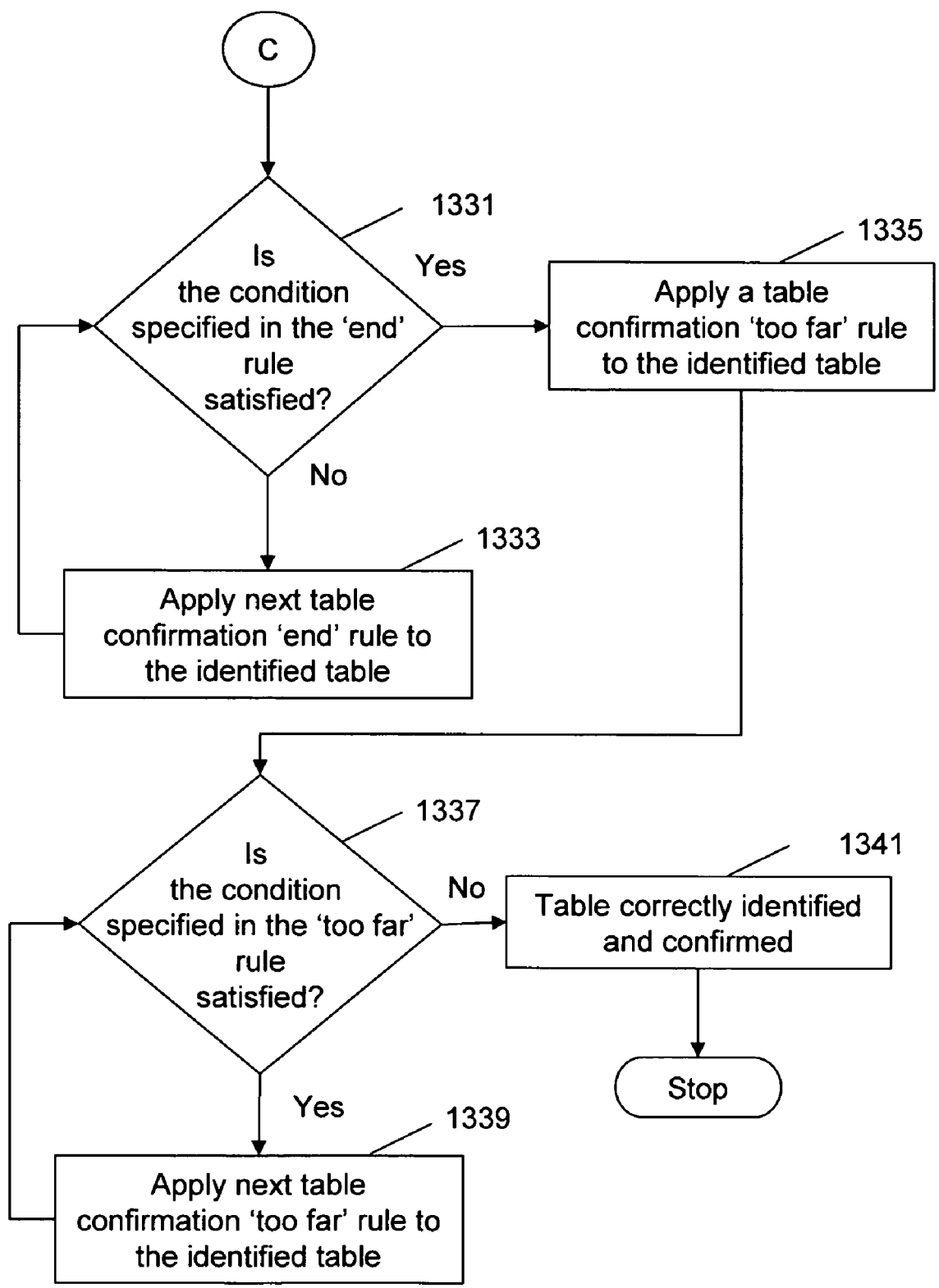
FIG. 13(Continue)

METHOD FOR EXTRACTING, INTERPRETING AND STANDARDIZING TABULAR DATA FROM UNSTRUCTURED DOCUMENTS

BACKGROUND

The present invention relates generally to management of tabular data, and more particularly, to identification, extraction, interpretation and standardization of tabular data from unstructured documents.

Businesses generate a vast amount of information for internal and external consumption, and much of this information is typically included in unstructured documents. A large number of such unstructured documents contain critical data in the form of tables, such as financial statements. Often, businesses are required, by law, to furnish these documents for public consumption. The data in these documents needs to be extracted and structured in a database, for research and analytical purposes. For example, all public companies in the US are required to file a variety of reports with the Securities and Exchange Commission. These filings contain data that is crucial for the investment community and required for research, analysis and compliance purposes. Investment research firms and investors need to structure the data in these filings before they can be used.

By their very nature, unstructured documents make the process of identification, extraction and normalization of such tabular data extremely difficult. In most domains, these documents do not have universally accepted codes or structures, which facilitate the process of structuring data in them. While there are many ways in which these documents can be made readable, e.g., documents formatted in the Portable Document Format [PDF], and accessible, e.g., via the worldwide web, they are usually created by using proprietary formatting and content representation preferences. Each company creates content in these documents the way it sees fit, and formats their presentation. As a result, there is no way of electronically identifying the type of information contained in the documents.

For a computerized program to extract the desired information from the document, the table must be identified and the content within the table parsed and broken down to its constituent parts. Once the content in the table is recognized and broken down, it needs to be interpreted and standardized, as appropriate. Once the data is extracted, it will, in many cases, need to be normalized into a common format. There may be many such normalization formats, and new formats may evolve in specific fields. Current solutions for normalization typically code the normalization logic in a programming language, making it difficult and expensive to introduce changes to it over time.

Current solutions for structuring tabular data in unstructured documents are largely manual or at best semi-automated. In the case of manual solutions, the data is re-entered into an RDBMS [Relational Database Management Systems]. For example, corporate fundamental information from public filings with the SEC are manually re-entered into an RDBMS and made available for the purpose of investment research. In a few cases, semi-automated solutions automate some portions of the process, typically programming a pre-defined set of logic.

The current process of manual re-entry has two major problems. First, the process of manual re-entry and validation is a time-consuming process and affects the timely availability of data. It is also expensive. Depending on the scope of the structuring exercise, a large number of people may need to be deployed to manually re-enter the information contained in these documents, which is then validated and made available for research and analysis purposes. Second, manual data entry is prone to errors, and, despite significant efforts to ensure the quality of the structured data, results in poor data quality.

Semi-automated solutions with programmed pre-defined logic suffer from inflexibility, and are therefore unable to reflect rapid changes in business needs and the environment over time. It is expensive and time-consuming to reflect new logic in such solutions. For example, the document creator may change the formatting and/or the logical organization of the content from one period to the next. Also, since the SEC revises filing requirements routinely, each such revision may require changes being made to the processing logic.

The above-mentioned challenges are significant and suggest a critical need for a fast, flexible and accurate method for identifying, extracting, interpreting and standardizing tabular data in unstructured documents, which also has the capability to self-learn changes introduced by the creator of the document.

PRIOR ART

U.S. Pat. No. 6,247,018, titled 'Method for processing a file to generate a database', assigned to Platinum Technology IP, Inc., filed on Apr. 16, 1998, describes a method for identifying tables in Hyper Text Markup Language (HTML) or ASCII documents, and recording the data contained in the tables in a database. An HTML page is retrieved from a user-specified URL or from a disk file, and is parsed for any HTML tables or text blocks that are translated into a database table in a database representation of the HTML page.

U.S. Pat. No. 6,714,941, titled 'Learning data prototypes for information extraction', assigned to University of Southern California, filed on Jul. 19, 2000, describes another method for determination of data characteristics, recognition and extraction of data, in order to facilitate information processing. The patent provides a method for learning the structure of data fields present in a semi-structured form, and extracting the data from the data fields.

U.S. Pat. No. 6,336,094, titled 'Method for electronically recognizing and parsing information contained in a financial statement', assigned to Price Waterhouse World Firm Services BV. Inc., filed on Jun. 30, 1995, is aimed at parsing financial statements stored in an ASCII file. The method described in the patent uses the mathematical structure of the tables contained in the financial statements, to identify, extract, parse or interpret the tabular data. More specifically, the patent describes an algorithm that traverses the table backward to discover the mathematical structures. The relationship between the various table components is identified, based on derived mathematical structures.

There are several limitations associated with the use of the above-mentioned methods. Even though some of these methods are directed towards identifying tables in documents, they do not provide for parsing and interpretation of the data contained in the identified tables. Hence, they do not facilitate standardization of tabular data contained in similar documents, such as the financial statements of different companies. In addition, some of the above-mentioned methods are limited to the identification of tabular data in financial statements, which are stored in a particular file format such as ASCII text. These methods are limited to table identification, table extraction and interpretation of the different sub-sections of tabular data contained in financial statements, and not every line item. The approach followed by these methods relies solely on the underlying mathematical structure of the financial statements, and is therefore not extendable to documents other than financial statements. By relying solely on the mathematical structure, these methods do not enable the granular parsing and interpretation of every line item, and also are not extendable to documents other than financial statements.

Therefore, there is a need for a self-learning, robust and flexible application that automates the identification, extraction, interpretation, standardization, and validation of tabular data from unstructured documents.

SUMMARY

The present invention is directed at a system, method and computer program that satisfies the need for an application that automates the process of identifying, extracting, interpreting and standardizing tabular data in unstructured documents.

An object of the present invention is to provide a system, method and computer program that enables an application designer to rapidly automate the structuring of tabular data.

Another object of the present invention is to provide a system, method and computer program to automate the identification of tabular data.

Another object of the present invention is to provide a system, method and computer program to automate the extraction of tabular data from unstructured documents.

Another object of the present invention is to provide a system, method and computer program to automate the interpretation of tabular data from unstructured documents.

Another object of the present invention is to provide a system, method and computer program to automate the standardization of tabular data from unstructured documents.

Another object of the present invention is to provide a system, method and computer program that enables an application designer to automate identification, extraction, interpretation and standardization of tabular data, purely by modeling a system of rules and with minimal or no programming.

Another object of the present invention is to provide a system, method and computer program that enables an application designer to model rules at different levels of granularity. For example, in the case of financial documents filed with the SEC, rule sets may be modeled for the system, industry, company, or a specific document type.

Still another object of the present invention is to provide a system, method and computer program to automate the identification, extraction, interpretation and standardization of inter-related tabular data from unstructured documents.

Another object of the current invention is to provide a method, system and computer program to convert the source document into a format that is optimal for the structuring process.

Another object of the current invention is to provide a method, system and computer program to provide a transparent link between the source document and the various stages, to enable the user to navigate back to the source from any stage.

The present invention provides a method, system and computer program to automate the identification, parsing, and interpretation of tabular data from unstructured documents stored in various formats such as ASCII text, Unicode text, HTML, PDF text, and PDF image. As opposed to the current practice of manually re-entering such data into a structured format such as an RDBMS, the current invention provides a method, a system and a computer program product to eliminate the manual effort by automating the process of structuring the data.

In the present invention, a set of identification rules, parsing/tokenizing rules, interpretation/mapping rules and standardizing rules are first developed, as required. The present invention also provides a method, system and program to represent the various types of structuring rules, as meta data in an RDBMS, which provides significant flexibility to add new rules and modify existing ones, as per changing requirements.

The process of developing rules for automating the structuring of tabular data, and its lifecycle, begins with the task of converting a given source document into a format that is most effective for structuring the tabular data of interest. The ASCII and HTML versions of the given document are created before rules are applied. The structuring process uses the ASCII as well as the HTML version and selects the one that yields greater structuring accuracy. The next step in the process is to develop a set of structuring rules, based on a training sample of the documents. The present invention provides the application designer with a framework to create a set of identification, extraction, interpretation and standardization rules. Once the designer is satisfied that the rules are yielding a satisfactory level of accuracy, they can be deployed for production use. As documents are being processed in production, the present invention enables automated updating of the rules, to correct structuring errors, if there are any.

The created and deployed table identification rules are applied to a set of documents, to correctly identify the table of interest. The table is parsed into its constituent parts, using the set of parsing/tokenizing rules developed for the purpose. Thereafter, the interpretation rules are applied to the parsed data, so the parsed data can now be interpreted with reference to a standardized set of data fields. The standardized data set is created by using the standardization rules developed for the documents.

The above-mentioned method is implemented by using a system that comprises three layers—a service layer, a data layer, and a presentation layer. The service layer consists of a web server and an application server. The data layer comprises a database, and the presentation layer a user interface and an RDBMS (relational database management system).

The web server runs a controller servlet compliant with industry standard web servers. The web server can access documents containing unstructured tabular data, stored in any format such as ASCII text, Unicode text, HTML, PDF text or PDF Image format. The application server comprises an engine and a data access layer. The engine, which is the runtime execution module of the system, extracts tabular data from documents, and interprets and standardizes it. Extraction, interpretation, and standardization is performed by using a set of identification, parsing, and mapping rules, as described above, which are stored in the database and are accessed by using the data access layer. The extracted data, along with other application-specific data, is stored in the database. The data access layer acts as a gateway to the database and the RDBMS. The extracted, interpreted, and standardized data is accessible to a user through the user interface. Development of rules for identification, extraction and interpretation are facilitated by the rules development UI.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which:

FIG. 4 displays the extracted balance sheet from a raw filing, using identification and extraction rules for a balance sheet;

FIG. 6 displays the extracted cashflow statement from a raw filing, using identification and extraction rules for a Cashflow Statement;

FIG. 7 displays the interpreted balance sheet from a raw filing, using interpretation rules for a Balance Sheet;

FIG. 8 displays the interpreted income statement, using interpretation rules for an Income Statement;

FIG. 9 displays the interpreted cashflow statement, using interpretation rules for a Cashflow Statement;

FIG. 10 displays the standardized balance sheet, derived by applying standardization rules for the Balance Sheet on the interpreted Balance Sheet;

FIG. 11 displays the standardized income statement, derived by applying standardization rules for the Income Statement on the interpreted Income Statement;

DESCRIPTION OF THE PREFERRED EMBODIMENT

1. Overview

The present invention provides a method, system and computer program to automate the identification, parsing, and interpretation of tabular data from unstructured documents stored in various formats, such as ASCII text, Unicode text, HTML, PDF text, and PDF image. As opposed to the current practice of manually re-entering such data into a structured format such as an RDBMS, the current invention provides a method, a system and a computer program product that eliminates the manual effort by automating the process of structuring the data.

Figure 1:
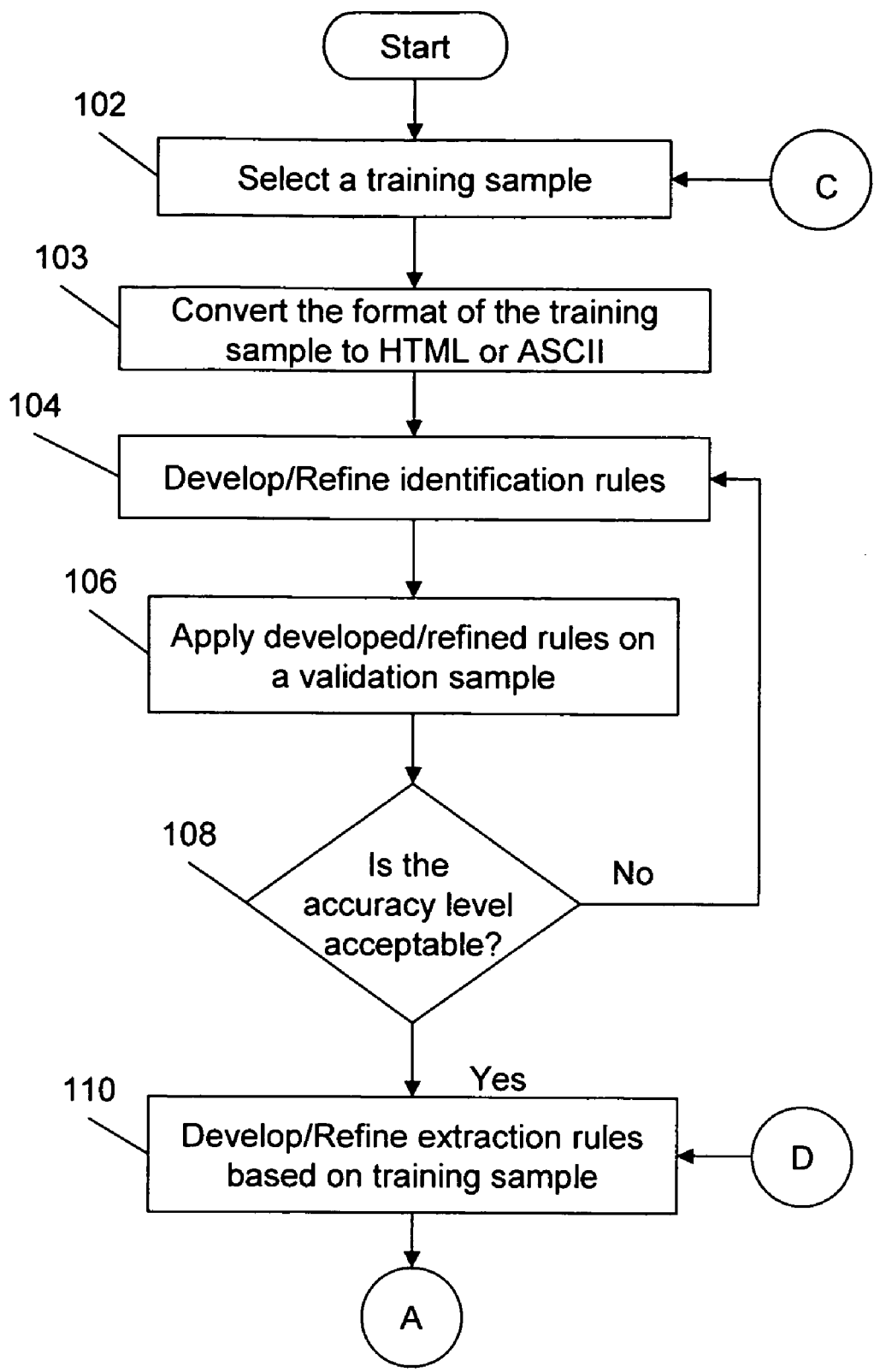
FIG. 1 is a flowchart illustrating the method for developing a set of identification, extraction and interpretation rules for a document set, in accordance with an embodiment of the present invention.

In the current invention, a set of identification rules, parsing/tokenizing rules, interpretation/mapping rules, and standardizing rules are first developed, as required. Referring primarily to FIG. 1, in accordance with an embodiment of the present invention, the process of developing rules for the automation of the structuring of tabular data, and its lifecycle, begins with the task of converting the document into a format that is the most effective for structuring the tabular data of interest. Therefore, the process starts with the identification of a training sample (document) at step 102. In an embodiment of the present invention, if the source document is in Hyper Text Markup Language [HTML], a copy of the document is created in ASCII text; and if the source document is a Portable Document Format [PDF] document, the ASCII and HTML versions of the document are created at step 103. The structuring process uses the ASCII as well as the HTML versions, and selects the one that offers greater structuring accuracy. At step 104, a set of table identification rules are developed, based on the training sample. The developed identification rules are applied at step 106 The step of table identification using the identification rules is described in detail with reference to FIG. 13. The results obtained by applying the identification rules are checked for accuracy at step 108. If the results are not accurate, the process goes back to step 104; otherwise the process moves to step 110.

At step 110, a set of extraction rules are developed, based on the training sample. The extraction rules enable tokenizing and parsing the content of the identified tabular data. The developed extraction rules are applied at step 112. The step of tokenizing and parsing of tabular data using the extraction rules is described in detail with reference to FIG. 14. The results obtained by applying the extraction rules are checked for accuracy at step 114. If the results are not accurate, the process goes back to step 110; otherwise the process moves to step 116.

At step 116, a set of interpretation rules are developed, based on the training sample. The interpretation rules enable interpretation of the parsed content. The developed extraction rules are applied at step 118. The step of interpreting the tabular data using the extraction rules is described in detail with reference to FIG. 15. The results obtained by applying the interpretation rules are checked for accuracy at step 120. If the results are not accurate, the process goes back to step 116; otherwise the process moves to step 122.

At step 122, a set of standardization rules are developed, based on the training sample. The standardization rules enable representing the interpreted content in a standard format. The developed standardization rules are applied at step 124. The results obtained by applying the standardization rules are checked for accuracy at step 126. If the results are not accurate, the process goes back to step 122; otherwise the process moves to step 128.

The preferred embodiment of the present invention provides the application designer with a framework, to create a set of identification, extraction, interpretation and standardization rules. Once the designer is satisfied that the rules are offering a satisfactory level of accuracy, they can be deployed for production usage at step 128. These rules are applied on other documents, to identify, parse and interpret tabular data at step 130. The accuracy of the results is also checked at step 132, and the rules revised at step 134, if the desired accuracy is not achieved. While the documents are being processed in production, the present invention enables the automated updating of the rules as a result of correcting structuring errors, if any.

While FIG. 1 reflects a sequential process of rules development, the application designer may choose to develop one set of rules at a time, and deploy it in production. The actual approach used will reflect the application designer's preferences and the characteristics of the tabular data and the document.

Figure 2:
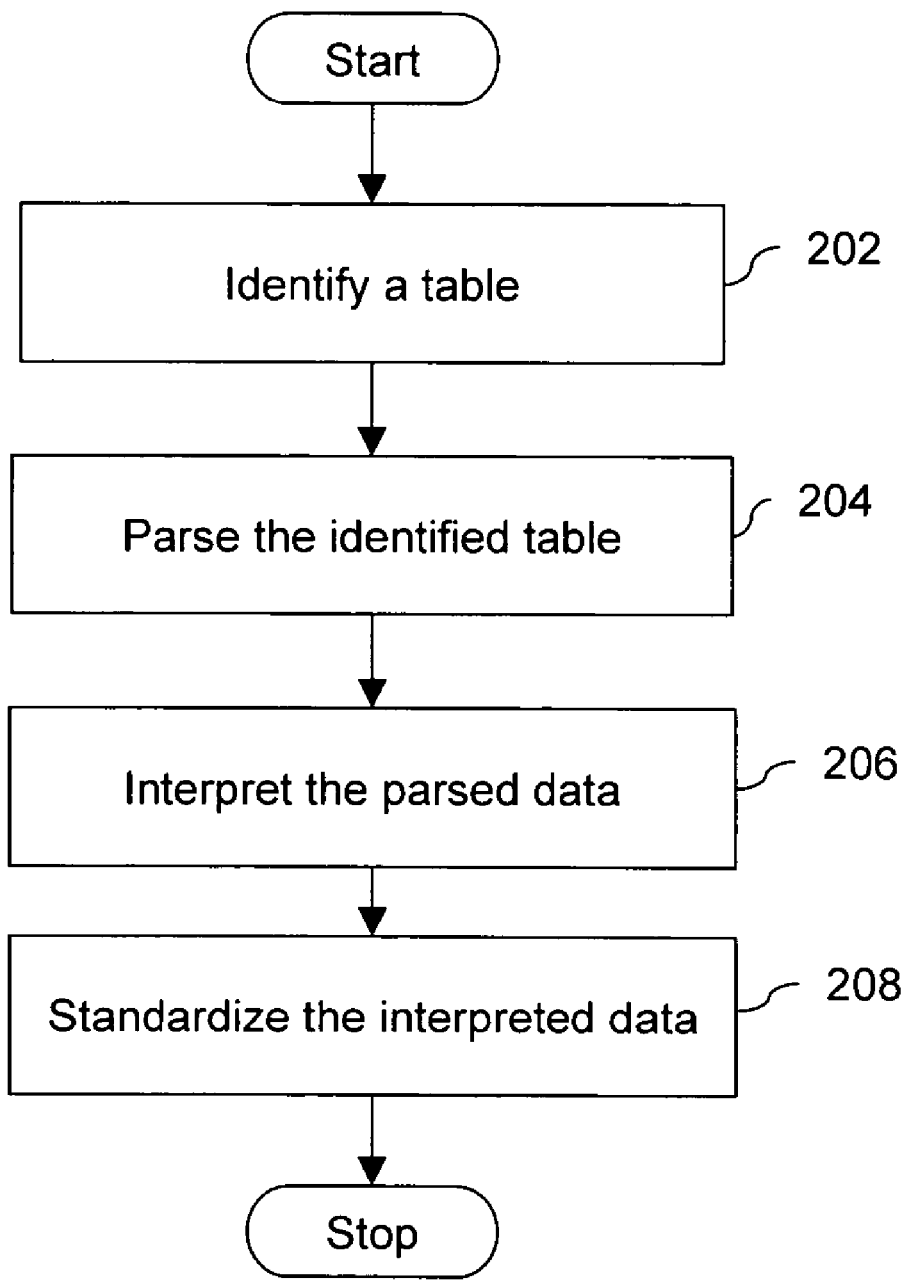
FIG. 2 is a flowchart illustrating the method for applying the rules developed, as described in FIG. 1, to identify, extract and interpret data from unstructured documents.

FIG. 2 is a flowchart illustrating the method for applying the rules, developed as described in FIG. 1, to identify, extract and interpret data from unstructured documents.

At step 202, the table identification rules are applied to a set of documents to correctly identify the table of interest. This step has been described in detail with reference to FIG. 13. At step 204, the table is parsed into its constituent parts, using the set of parsing/tokenizing rules developed for the purpose. Step 204 has been described in detail with reference to FIG. 14. At step 206, the interpretation rules are applied to the parsed data, so it can be interpreted with reference to a standardized set of data fields. The step of interpreting the data has been described later in the description section with reference to FIG. 15. At step 208, a standardized data set is created by using the standardization rules developed for the documents.

Further, the present invention also preserves an audit trail/link between the table in the source document and the various stages of structuring described in FIG. 2. The links are stored in the RDBMS being used to store the structured data, and a new version of the source document is created, with the links embedded in it. The present invention also provides a method, system and program that represent the various types of structuring rules described in FIG. 1, as meta data in an RDBMS, which provides significant flexibility to add new rules and modify existing rules, as per changing requirements.

Figure 3:
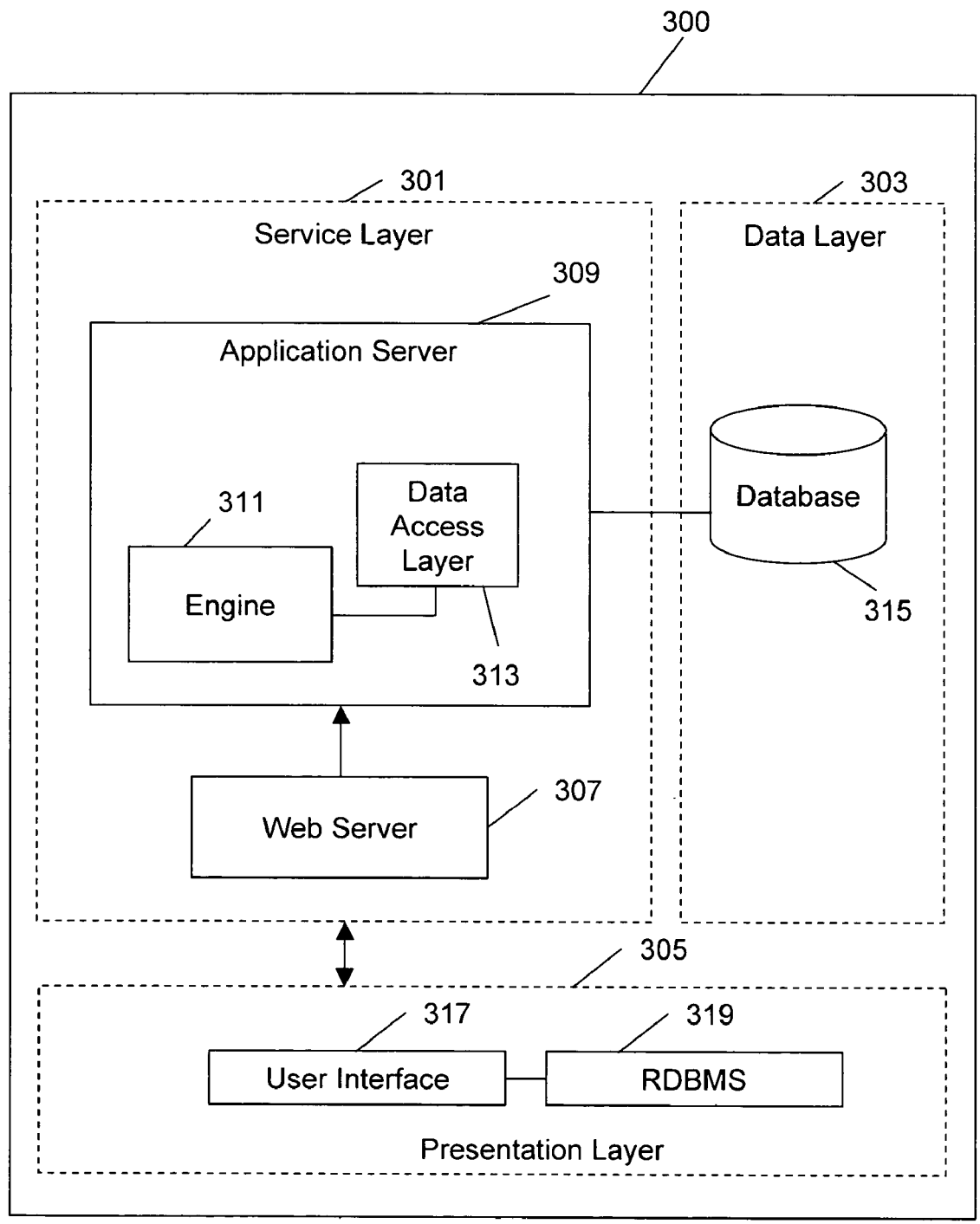
FIG. 3 is a block diagram illustrating the system for identifying, parsing and interpreting tabular data from unstructured documents, in accordance with an embodiment of the present invention.

FIG. 3 is a block diagram illustrating the system for identifying, parsing, and interpreting tabular data from unstructured documents, in accordance with an embodiment of the present invention. System 300 comprises three layers—a service layer 301, a data layer 303, and a presentation layer 305. Service layer 301 comprises a web server 307 and an application server 309. Data layer 303 comprises a database 315. Presentation layer 305 comprises a user interface 317 and an RDBMS 319.

Web Server 307 runs a controller servlet that is compliant with industry-standard web servers. Web server 307 can access documents containing unstructured tabular data, stored in any format such as ASCII text, Unicode text, HTML, PDF text, or PDF Image format. Application server 309 comprises an engine 311 and a data access layer 313. Engine 311 is the runtime execution module of system 300. Engine 311 extracts tabular data from the documents, and interprets and standardizes it. The extraction, interpretation and standardization is performed by using a set of identification, parsing, and mapping rules, as described above, which are stored in database 315 and are accessed by using data access layer 313. The extracted data, along with other application specific data, is stored in RDBMS 319. Data access layer 313 acts as a gateway to database 315 and RDBMS 319. The extracted, interpreted and standardized data is accessible to a user through user interface 317. Rules for identification, extraction and interpretation are facilitated by the Rules Development UI (not shown in the figure).

2. Example Applications

Extracting Financial Statements from Filings by Public Corporations in the U.S.—an Example The example application described here automates the structuring of financial statements contained in the regulatory filings of public companies in the U.S. These filings have to be filed by every public company on a quarterly and annual basis, within a stipulated period after the end of the company's fiscal quarter or year.

The automated structuring process involves the positive electronic identification of the financial statements in the sample filing by a computer program; extraction of the statements, including the parsing of the statement into its constituent parts; interpretation of each line item in the financial statement, with reference to a standardized financial statement format; and the creation and storage of standardized financial statements in an RDBMS. Table 1 illustrates a part of a sample filling showing a consolidated balance sheet.

TABLE 1

CONSOLIDATED BALANCE SHEET
The Black & Decker Corporation and Subsidiaries
(Dollars in Millions Except Per Share Amount)

| Assets | Jun. 29, 2003 (Unaudited) | Dec. 31, 2002 |
|---|---|---|
| Cash and cash equivalents | $ 156.6 | $ 517.1 |
| Trade receivables | 820.7 | 729.0 |
| Inventories | 768.1 | 748.9 |
| Other current assets | 215.0 | 198.9 |
| Total Current Assets | 1,960.4 | 2,193.9 |
| Property, Plant, and Equipment | 638.6 | 655.9 |
| Goodwill | 749.6 | 729.1 |
| Other Assets | 560.9 | 551.6 |
|  | $3,909.5 | $4,130.5 |

Referring now primarily to FIG. 4, the results of the automated identification and extraction of the balance sheet illustrated in Table 1 are displayed. The following aspects of the identification and extraction step can be observed in FIG. 4:

The beginning and end of the Balance Sheet has been correctly identified, and the columns in Table 1 have been accurately separated from each other and structured into cells.

Comparing the extracted Balance Sheet in FIG. 4 with the Balance Sheet in the filing, as shown in Table 1, some of the line items have been correctly combined as a single line item.

By comparing the extracted Balance Sheet in FIG. 4 with the Balance Sheet in the filing, as shown in Table 1, line items that were headers have been correctly identified or ignored.

The present invention has correctly extracted the details of the inventory line item from the footnotes to the financial statements. The inventory break-up was found to be a table that is related to the Balance Sheet.

Figure 5:
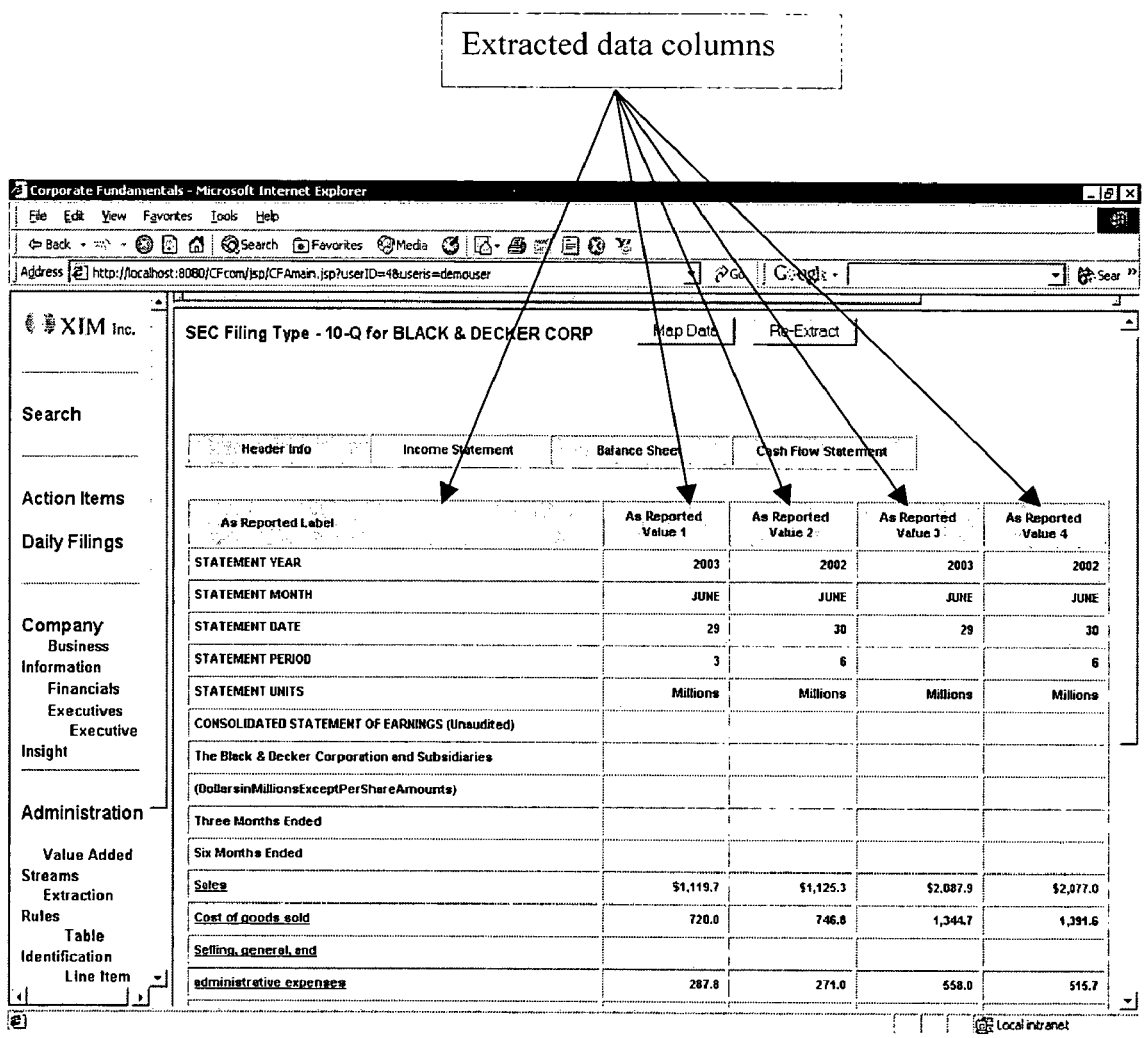
FIG. 5 displays the extracted income statement from a raw filing, using identification and extraction rules for an Income Statement.

Similarly, FIGS. 5 and 6 display the extracted Income and Cashflow Statement, respectively. The structure and scope of the different types of structuring rules is discussed in greater detail in Section 3.

TABLE 2

Hierarchical Structure

Balance Sheet - Hierarchical Structure
0    STATEMENT YEAR 2003   +   −1
1    STATEMENT MONTH JUNE   +   −1
2    STATEMENT DATE 29   +   −1
3    STATEMENT PERIOD   +   −1

TABLE 2-continued

Hierarchical Structure

```
4    STATEMENT UNITS Millions    +    −1
5    STATEMENT CURRENCY USD    +    −1
6    STATEMENT TYPE U    +    −1
7    STATEMENT FOR Q2    +    −1
8    CONSOLIDATED BALANCE SHEET    +    −1
9    The Black & Decker Corporation and Subsidiaries    +    −1
10   (DollarsinMillionsExceptPerShareAmount)    +    −1
11   - -------------------------------------------------------
-------- June 29, December 31,    +    −1
12       +    −1
13   (Unaudited)    +    −1
14   - -------------------------------------------------------
--------    +    −1
15   Assets    +    −1
16   Cash and cash equivalents $ 156.6    +    21
17   Trade receivables 820.7    +    21
18   Inventories 768.1    +    21
19   Other current assets 215.0    +    21
20   - -------------------------------------------------------
--------    +    −1
21   Total Current Assets 1,960.4    +    27
22   - -------------------------------------------------------
--------    +    −1
23   Property, Plant, and Equipment 638.6    +    27
24   Goodwill 749.6    +    27
25   Other Assets 560.9    +    27
26   - -------------------------------------------------------
--------    +    −1
27   $3,909.5    +    48
28   Liabilities and Stockholders' Equity    +    −1
29   Short-term borrowings $ 87.0    +    34
30   Current maturities of long-term debt .4    +    34
31   Trade accounts payable 316.3    +    34
32   Other accrued liabilities 762.1    +    34
33   - -------------------------------------------------------
--------    +    −1
34   Total Current Liabilities 1,165.8    +    48
35   - -------------------------------------------------------
--------    +    −1
36   Long-Term Debt 936.1    +    48
37   Deferred Income Taxes 212.4    +    48
38   Postretirement Benefits 421.5    +    48
39   Other Long-Term Liabilities 522.8    +    48
40   Stockholders' Equity    +    −1
41   Common stock, par value $.50 per share 38.8    +    46
42   Capital in excess of par value 475.9    +    46
43   Retained earnings 624.8    +    46
44   Accumulated other comprehensive income (loss) (488.6)    +    46
45   - -------------------------------------------------------
--------    +    −1
46   Total Stockholders' Equity 650.9    +    48
47   - -------------------------------------------------------
--------    +    −1
48   $3,909.5    +    −1
49   See Notes to Consolidated Financial Statements (Unaudited)    +    −1
Income Statement - Hierarchical Structure
0    STATEMENT YEAR 2003    +    −1
1    STATEMENT MONTH JUNE    +    −1
2    STATEMENT DATE 29    +    −1
3    STATEMENT PERIOD 3    +    −1
4    STATEMENT UNITS Millions    +    −1
5    STATEMENT CURRENCY USD    +    −1
6    STATEMENT TYPE U    +    −1
7    STATEMENT FOR Q2    +    −1
8    CONSOLIDATED STATEMENT OF EARNINGS (Unaudited)    +    −1
9    The Black & Decker Corporation and Subsidiaries    +    −1
10   (DollarsinMillionsExceptPerShareAmounts)    +    −1
11   - -------------------------------------------------------
--------    +    −1
12   Three Months Ended    +    −1
13   Six Months Ended June 29, 2003 June 30, 2002 June 29, 2003 June 30, 2002    +    −1
14   - -------------------------------------------------------
--------    +    −1
15   Sales $1,119.7    +    −1
16   Cost of goods sold 720.0 -    19
17   Selling, general, and administrative expenses 287.8 -    19
18   - -------------------------------------------------------
```

TABLE 2-continued

Hierarchical Structure

```
--------    +    -1
19   Operating Income 111.9    +    -1
20   Interest expense (net of interest income) 7.7 -    23
21   Other expense .5 -    23
22   - --------------------------------------------------------------
--------    +    -1
23   Earnings Before Income Taxes 103.7    +    26
24   Income taxes 28.0 -    26
25   - --------------------------------------------------------------
--------    +    -1
26   Net Earnings $ 75.7    +    -1
27   Net Earnings Per Common    +    -1
Cashflow Statement - Hierarchial Structure
0     STATEMENT YEAR 2003    +    -1
1     STATEMENT MONTH JUNE    +    -1
2     STATEMENT DATE 29    +    -1
3     STATEMENT PERIOD 6    +    -1
4     STATEMENT UNITS Millions    +    -1
5     STATEMENT CURRENCY USD    +    -1
6     STATEMENT TYPE U    +    -1
7     STATEMENT FOR Q6    +    -1
8     Net earnings $ 119.1    +    16
9     Depreciation and amortization 72.7    +    16
10    Other 3.2    +    16
11    Trade receivables (57.7)    +    16
12    Inventories 13.0    +    16
13    Trade accounts payable (35.1)    +    16
14    Restructuring spending (23.5)    +    16
15    Other assets and liabilities (91.1)    +    16
16    Cash Flow From Operating Activities .6    +    28
17    Proceeds from disposal of assets 4.9    +    20
18    Capital expenditures (51.6)    +    20
19    Other investing activities (1.2)    +    20
20    Cash Flow From Investing Activities (47.9)    +    28
21    Net increase (decrease) in short-term borrowings 81.9    +    26
22    Payments on long-term debt (310.4)    +    26
23    Purchase of common stock (77.5)    +    26
24    Issuance of common stock 1.8    +    26
25    Cash dividends (18.6)    +    26
26    Cash Flow From Financing Activities (322.8)    +    28
27    Effect of exchange rate changes on cash 9.6    +    28
28    (Decrease) Increase In Cash And Cash Equivalents (360.5)    +    30
29    Cash and cash equivalents at beginning of period 517.1    +    30
30    Cash And Cash Equivalents At End Of Period $ 156.6    +    -1
```

Referring now primarily to Table 2, the results of the identification of hierarchical mathematical structural relationships amongst the line items are displayed. The last column in Table 2 represents the hierarchical structure, where a value of −1 indicates that the item does not have a parent. A positive value in this column implies that the item in the line indicated by the value is the parent of the current row. The third-last column represents the value for that line. For example, '2003' in line 0 represents the value for the STATEMENT YEAR. In this example, lines 0 through 15 are header labels for a Balance Sheet, and therefore do not have any parent lines, since they are not a part of the Balance Sheet. Lines 16 through 19 have line 21 as their parent. Line 21 is the 'Total Current Assets'. Line 21 through 26, in turn, have a parent in line 27, which is the grand total of the assets side of the balance sheet. In the case of financial statements, such a mathematical relationship serves to validate the integrity of the extracted statement, and can also be used to identify the key sections in a financial statement.

Referring now primarily to FIGS. 7, 8 and 9, the results of the automated interpretation of the three financial statements given in Table 2, the balance sheet, the income statement and the cashflow statement are displayed. A set of interpretation rules was applied to the extracted items, to interpret each line item against a pre-defined standardized financial statement format.

Figure 12:
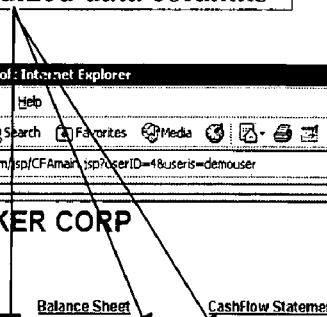
FIG. 12 displays the standardized cashflow statement, derived by applying standardization rules for the Cashflow Statement on the interpreted Cashflow Statement.

FIGS. 10, 11 and 12 illustrate the normalized and standardized balance sheet, income statement, and cashflow statement relevant in this case. The present invention enables easy addition and modification of financial statement formats and interpretation rules, discussed in detail in Section 3.

The interpreted data has been aggregated, and the signs of the numeric values standardized.

3. Execution Method

As recited in Section 1, FIG. 2 is a flowchart illustrating the method for identifying, parsing, interpreting and standardizing tabular data from unstructured documents, in accordance with an embodiment of the present invention.

Identification

With reference to FIG. 2, a table is identified in a document specified by a user at Step 202. The document may be in various formats such as ASCII text, Unicode text, HTML, PDF text, and PDF image. The present invention uses Optical Character Recognition (OCR) to scan the PDF image documents and convert the image into text. Similarly, PDF text documents are converted into text by using a filter. HTML documents are converted into text format before they are processed further, and the text documents are processed as is.

Once the document is converted into a text format, a set of table identification rules are applied, to identify the table of interest. If any of the table identification rules identify a candidate in the document as the possible table of interest, a set of table confirmation rules is applied to the identified table, to verify that the identified table is the table of interest. This step eliminates erroneous identification of a table. The process of table identification and confirmation is described in detail in FIG. 13.

Next, at step 204, the content of the identified table is tokenized or parsed. Tokenizing/parsing is performed to enable the interpretation and standardization of the table content. A table is tokenized or parsed by using a set of parsing rules.

The content of the identified table is first filtered to remove any invalid data. Examples of invalid data include HTML tags that are embedded between text contents of the table, and signify the beginning of a table. Then, by using parsing rules, the table content is tokenized/parsed into items or tokens on a line-by-line basis. Next, a set of validation rules are applied to the tokenized/parsed contents of the identified table, in order to verify the accuracy of tokenizing/parsing. This step eliminates erroneous tokenization/parsing of the table content.

The process of table content tokenization/parsing is described in detail with reference to FIG. 14.

Next, at step 206, tokens obtained at step 204 are interpreted and associated with a corresponding item from a standard format, when required, using the set of interpretation or mapping rules described in Section 4. For example, in the case of financial statements, different companies have different descriptors for the line items in the statements. One company may use the term 'Cash' to identify its cash balances, and another may use 'Cash at Bank'. Assuming that the standardized format refers to cash balances as 'Cash and Cash Equivalents', the process of interpretation associates both these items from the two companies with 'Cash and Cash Equivalents'. The process of interpretation involves recognizing the different sections in the tokenized content of the identified table, and then mapping the tokens in a section onto a standard template. The interpretation of tokens is performed by using a set of interpretation rules.

The process of the interpretation of the tokenized content of a table is described in detail with reference to FIG. 15.

Figure 13:
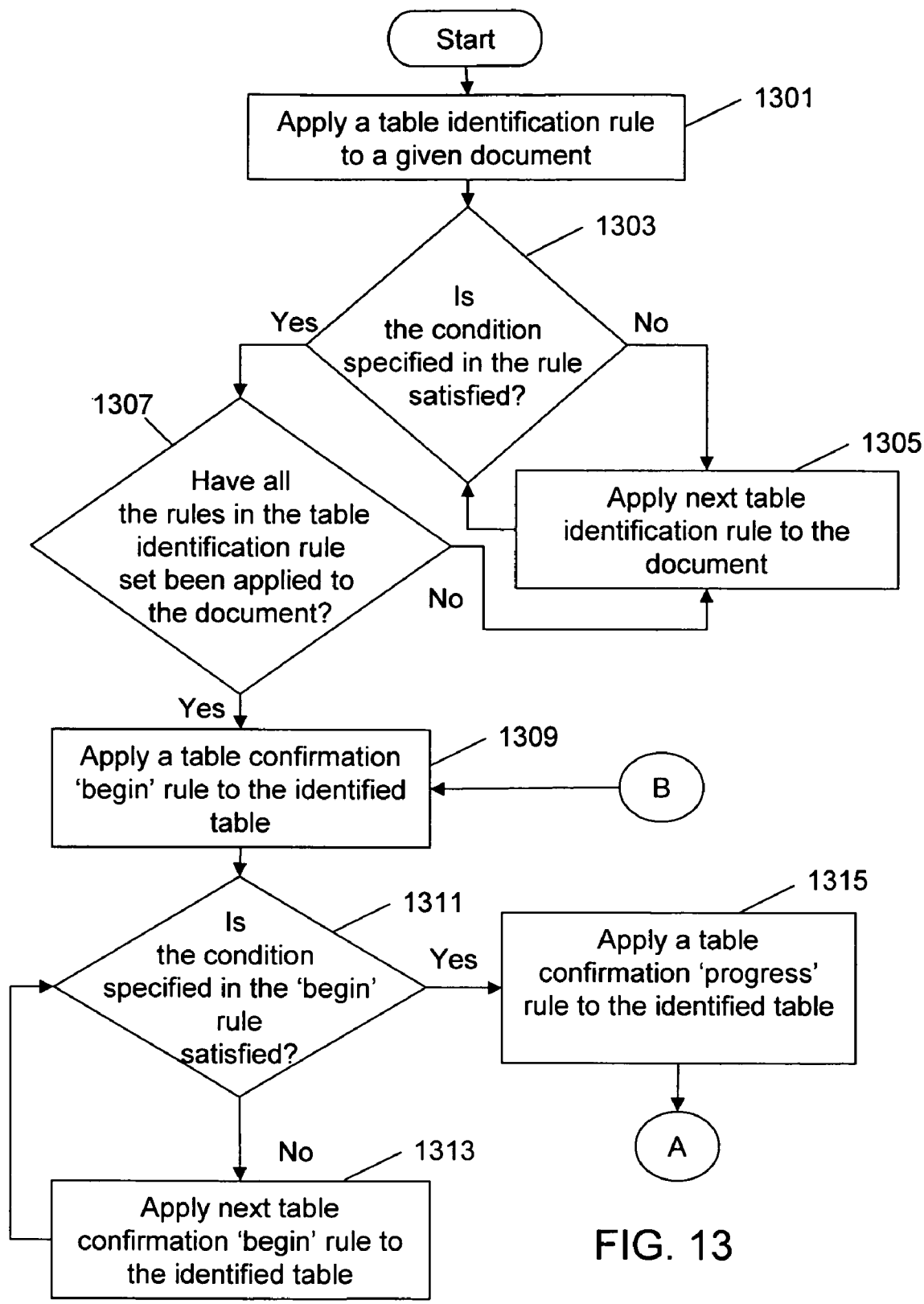
FIG. 13 is a flowchart illustrating a method of table identification and confirmation, in accordance with an embodiment of the present invention.

FIG. 13 is a flowchart illustrating the method of table identification and confirmation, in accordance with an embodiment of the present invention.

At step 1301, a set of table identification rules are applied to a given document, in order to identify a table contained within the document. Table identification rules may be generic or specific to a document type or an organization. For example, a generic rule set to identify a table may comprise the following rules:

| 1 | 'TABLE ROW START' | 'TOKEN COUNT' '3' |
|---|---|---|
| 2 | 'TABLE ROW START' | 'TABLE TAG' |
| 3 | 'TABLE ROW END' | 'TOKEN COUNT' '1' |
| 4 | 'TABLE ROW END' | 'END TABLE TAG' '1' |
| 5 | 'END OF LINE CHAR' | 'NEW LINE' |
| 6 | 'PARAGRAPH TAG' | 'NEW LINE' |
| 7 | 'TABLE DATA TAG' | 'WHITESPACE' '3' |
| 8 | 'TABLE ROW TAG' | 'NEW LINE' |
| 9 | 'TOKEN PROPERTY' | 'WHITESPACE' '2' |

The first column of the rule set defines a rule property, whereas the other columns define values for the respective rule property. The same property can have more than one set of values, in which case the engine will apply them in order.

Rules 1 and 2 in the above-mentioned exemplary generic rule set are examples of a rule property with alternative value conditions for identifying the beginning of a table. Rule 1 specifies that if the number of tokens in a line is equal to three, the row is identified as the beginning of a table. Rule 2 specifies an alternate condition—if an HTML table tag is encountered, it is identified as the beginning of a table.

The next two rules, Rule 3 and 4, in the exemplary generic rule set specify conditions for identifying the end of a table. Rule 3, specifies that if the number of tokens in a row is equal to one, the row is identified as the end of a table. Rule 4, specifies an alternate condition—if an HTML end table tag is encountered, it is identified as the end of a table.

Each of remaining rules, Rules 5-8, defines a property and an action that should be taken, corresponding to the property. For example, Rule 5 specifies that if an end-of-line character is encountered, it should be treated as the beginning of a new line. Rule 8 defines a token property and specifies that two or more consecutive white spaces will signify the beginning of a new token.

A table identification rule set specific to a document type, for example, specific to a financial document, may comprise rules such as:

| 10 | 'CONSOLIDATED STATEMENTS OF INCOME' | 'STARTSWITH' 'INCOME STATEMENT' |
|---|---|---|
| 11 | 'STATEMENTS OF EXPENSES' | 'STARTSWITH' 'INCOME STATEMENT' |
| 12 | 'CONSOLIDATED STATEMENTS OF INCOME' | 'CONTAINS' 'INCOME STATEMENT' |
| 13 | 'CONSOLIDATED STATEMENTS OF OPERATIONS' | 'STARTSWITH' 'INCOME STATEMENT' |

The first column specifies the text descriptor to be looked for in the given document, the second column specifies the grammar that is to be applied, and the third column specifies the name that is to be given to the identified table.

Rule 10 of the above-mentioned exemplary table identification rules states that if the text descriptor 'CONSOLIDATED STATEMENTS OF INCOME' is encountered, it is a possible instance of the table of interest; and the table of interest is labeled as 'INCOME STATEMENT'. The grammar 'STARTSWITH' specifies that the occurrence of the text descriptor is a valid instance, only if the line in the given document starts with the text descriptor 'CONSOLIDATED STATEMENTS OF INCOME'. The other two exemplary specific table confirmation rules, Rule 11 and Rule 13, extend the same condition, to capture other text descriptors such as 'STATEMENTS OF EXPENSES', and 'CONSOLIDATED STATEMENTS OF OPERATIONS', to identify a table labeled as 'INCOME STATEMENT'. Rule 12 states that if text descriptor 'CONSOLIDATED STATEMENTS OF INCOME' is encountered, it is a possible instance of the table of interest and the table is labeled as 'INCOME STATEMENT'.

At step 1303, it is determined whether the condition specified in the applied rule has been satisfied. If it has not been satisfied, then at step 1305, the next rule from the table identification rule set is applied to the given document and step 1303 is repeated.

If the condition, as determined at step 1303, is satisfied, then at step 1307 it is determined whether all rules in the table identification rule set have been applied to the given document. If all the rules in the table identification rule set have not been applied to the given document then, step 1305 is repeated.

Once a table identification rule is found to apply, a set of table confirmation rules is applied to the identified table, to verify the identified table. Table confirmation rules are also known as neighborhood rules and comprise four types:

'Begin' rules—to detect and validate the neighborhood around the beginning of the table;

'Progress' rules to detect and validate the contents of the table;

'End' rules to detect and validate the end of the table; and

'Too far' rules to prevent the identification process from overrunning the end of the table The first column specifies the text descriptor, the second specifies the action to be performed, and the third specifies the grammar to be applied.

At step 1309, a begin rule from the table confirmation rule set is applied to the identified table. Examples of 'begin' rules include:

| 14 | 'NEIGHBORHOOD' | 'BEGIN' | '5' |
|---|---|---|---|
| 15 | 'ASSETS' | 'EXIT' | 'EQUALS' |
| 16 | 'CURRENT ASSETS' | 'EXIT' | 'STARTSWITH' |

Rule 14, an exemplary begin rule, states that the neighborhood property is defined as the five lines following the table identifier found previously. Rule 15, another exemplary 'begin' rule, states that if the text descriptor 'ASSETS' is encountered, the condition describing the beginning of a table is satisfied. The grammar constraint 'EXIT' implies that no more begin rules need to be applied. The grammar 'EQUALS' specifies that the entire line [table row] should be equal to (i.e., should only contain) the text descriptor 'ASSETS', in order to satisfy the 'begin' rule. The third exemplary rule, Rule 16, specifies that if a line 'STARTSWITH' the text descriptor 'CURRENT ASSETS', it will be deemed that a valid beginning of the table has been found.

At step 1311, it is determined whether the condition specified in the applied 'begin' rule is satisfied. If the condition is not satisfied, then at step 1313, the next 'begin' rule from the table confirmation rule set is applied to the identified table, and step 1311 is repeated.

If the condition determined at step 1311 is satisfied, and the rule specifies an "EXIT" action, then at step 1315 a 'progress' rule from the table confirmation rule set is applied to the identified table. Examples of 'progress' rules include:

| 17 | 'NEIGHBORHOOD' | 'PROGRESS' | '10' |
|---|---|---|---|
| 18 | 'OTHER ASSETS' | 'CONTINUE' | 'CONTAINS' |
| 19 | 'TOTAL LIABILITIES' | 'EXIT' | 'CONTAINS' |

The first exemplary 'progress' rule, Rule 17, states that the neighborhood property for progress rules is defined as 10 lines from the line in which the last begin rule was satisfied. Rule 18 states that if a line is found to 'contain' the text descriptor 'other assets' within the defined neighborhood property, the progress condition is satisfied. The 'CONTINUE' action of the rule specifies that the engine will continue to apply other progress rules. Rule 19 states that if the text descriptor 'TOTAL LIABILITIES' is encountered within the neighborhood after the previous progress rule, the condition describing the progress of a table is satisfied and no more 'progress' rules need to be applied to the identified table, as specified by the 'EXIT' action. After encountering a progress rule with 'EXIT' action, the total number of progress rules is compared to a minimum acceptable threshold.

After step 1315, the process moves to step 1317, where table confirmation 'toofar' rules are applied.

At step 1317, 'toofar' rules are applied to check whether the identification process has gone too far beyond the logical end of the table. An example of a 'toofar' rule for an Income Statement includes:

| 20 | 'CONSOLIDATED STATEMENT OF CASHFLOWS | 'NA' | 'STARTSWITH' |
|---|---|---|---|

The exemplary 'toofar' rule states that if the text 'CONSOLIDATED STATEMENT OF CASHFLOWS' is encountered in the current line being examined, and the current line starts with text, the identification process has gone too far.

At step 1319, it is determined whether the condition specified in the applied 'too far' rule has been satisfied. If the condition is satisfied, the search has gone too far and the process moves back to step 1309. If the condition specified at step 1319 is not satisfied, the process moves to step 1321.

At step 1321, it is determined whether the condition specified in the applied 'progress' rule is satisfied. If the condition is not satisfied, then at step 1323, the next 'progress' rule from the table confirmation rule set is applied to the identified table and step 1321 is repeated. The process of applying 'progress' rules stops if a progress rule is satisfied and its action condition set to 'EXIT', or all the progress rules have been applied. At the end of the 'progress' rule phase, the total number of 'progress' rules that were found to be applicable is compared to the minimum acceptable threshold. If the minimum threshold is satisfied, then execution moves to the process of applying 'end' rules.

If the condition, as determined at step 1321, is satisfied, then at step 1325 an 'end' rule from the table confirmation rule set is applied to the identified table. Before an end rule is applied, 'toofar' rules, as described above, are applied to ensure that the identification process has not gone beyond the logical end of the table. Examples of 'end' rules include:

| 21 | 'See Notes' | 'EXIT' | 'STARTSWITH' |
|---|---|---|---|
| 22 | 'See the Notes' | 'EXIT' | 'CONTAINS' |

Rule 21, an exemplary 'end' rule, states that if the text descriptor 'See Notes' is encountered, the condition describing the end of a table is satisfied and no more 'end' rules need to be applied to the identified table, as specified by the 'EXIT' condition. Rule 22, another exemplary rule, states that the condition describing the end of a table is satisfied if a line is found containing the text descriptor 'See the Notes'.

After step 1325, the process moves to step 1327, where table confirmation 'toofar' rules are applied. At step 1327, 'toofar' rules are applied to check whether the identification has gone too far beyond the logical end of the table. At step 1329, it is determined whether the condition specified in the applied 'toofar' rule is satisfied. If the condition is satisfied, the process moves back to step 1321. If the condition at step 1329 is not satisfied, the process moves to step 1331.

At step 1331, it is determined whether the condition specified in the applied 'end' rule is satisfied. If the condition is not satisfied, then at step 1333, the next 'end' rule from the table confirmation rule set is applied to the identified table and step 1331 is repeated. When the condition in step 1331 is satisfied, the process moves to step 1335, where a table confirmation 'toofar' rules are applied. At step 1335, 'toofar' rules are applied to check whether the identification has gone too far beyond the logical end of the table.

At step 1337, it is determined whether the condition specified in the applied 'too far' rule is satisfied. If the condition is satisfied, then at step 1339, the next 'toofar' rule from the table confirmation rule set is applied to the identified table and step 1337 is repeated.

If the condition, as determined at step 1337 is not satisfied, the identified table is deemed to be confirmed and verified at step 1341.

Parsing

Figure 14:
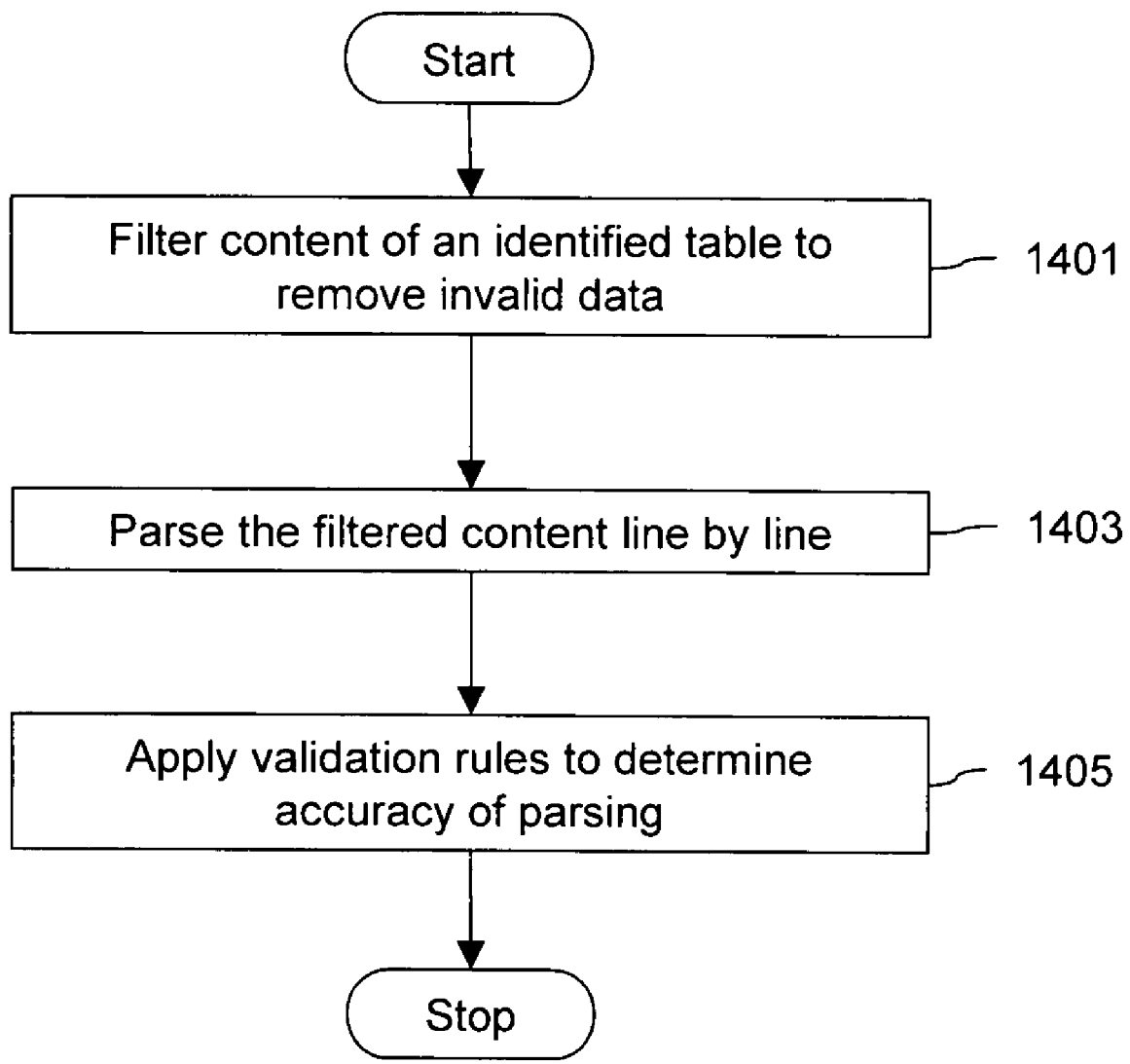
FIG. 14 is a flowchart illustrating a method of table content tokenization/parsing, in accordance with an embodiment of the present invention.

FIG. 14 is a flowchart illustrating the method of table content tokenization/parsing, in accordance with an embodiment of the present invention.

At step 1401, the content of the identified table is first filtered, in order to remove any invalid data. Examples of rules used for removing any invalid data include:

| 23 | "BALANCE SHEET" "<TABLE>" | "STARTSWITH" |
| 24 | "BALANCE SHEET" "ITEM" | "STARTSWITH" |
| 25 | "BALANCE SHEET" "PART" | "STARTSWITH" |
| 26 | "BALANCE SHEET" "CAPTION" | "STARTSWITH" |
| 27 | "BALANCE SHEET" "SIGNATURE" | "STARTSWITH" |
| 28 | "BALANCE SHEET" "MANAGEMENT ANALYSIS" | "STARTSWITH" |
| 29 | "BALANCE SHEET" "PAGE" | "STARTSWITH" |
| 30 | "BALANCE SHEET" "--------" | "CONTAINS" |

Rule 23, an exemplary rule, states that for a table identified as 'BALANCE SHEET', if the line starts with the phrase '<TABLE>', it is an invalid line. Similarly, Rule 24 states that if the line starts with the phrase 'ITEM', it is an invalid line.

At step 1403, the filtered content of the identified table is parsed or broken into tokens on a line-by-line basis. The tokenizing/parsing process is performed by using a set of parsing rules. Parsing rules include rules that recognize a character as text, number, operator, or decimal and classification rules, based on a patterns of sequences of characters, to recognize a token as a 'text' or a 'number' token. The following is an exemplary set of character definition rules:

| Definitions: |
| --- |
| text = [ a-zA-Z&:éê'ôà< >] |
| number = [0-9$( )-] |
| operator = [,( )`*/+  −  ] |
| decimal = [.] |

The following is an exemplary set of token classification rules:

If there are more than a specified number of white spaces in the token, they should be taken as the end of the current token and the beginning of a new token.

If a character is a digit or number, and the tokenizing/parsing of a new token has begun, the token should be categorized as a 'number' token.

If any character in the token is a character or 'not a number', the token should be defined as a 'text' token.

If a current character in the token is a '(' operator, then the white space characters following the '(' operator should be ignored until the next non-white space character is encountered.

If the current character in the token is a '-' operator, then the white space characters following the '-' operator should be ignored until the next non-white space character is encountered.

If there are more than a specified number of '-' characters in the current token, the token definition should be changed to a 'text' token.

If the current character in the token is a ')' operator, and if previously a '(' operator has been encountered, the ')' operator should be taken as the end of the current token and the beginning of a new one.

If there are more than a specified number of '.' characters in a sequence in the token, the token definition should be changed to that of a 'text' token.

At step 1405, the hierarchical mathematical structure in a table is discovered and used in conjunction with a set of validation rules, which are applied to the tokenized/parsed contents of the identified table to verify the accuracy of the tokenizing/parsing. The following is a set of example rules for validating a Balance Sheet are as follows:

| 31 | 'FINAL ROW' | '1' | |
| --- | --- | --- | --- |
| 32 | 'STOCKHOLDER' | 'CONTAINS' | 'CONTINUE' |
| 33 | 'EQUITY' | 'CONTAINS' | 'EXIT' |
| 34 | 'CAPITAL' | 'CONTAINS' | 'EXIT' |
| 35 | 'MAX UNFATHOMED ROWS' | '1' | |

Rule 31 specifies that the hierarchical structure of the table should have only one root at the end of the discovery process. A hierarchical structure implies that each row in the table will be a constituent part of the final row, either directly or indirectly, through another row. Therefore, a row can be a part of another row, which will be referred to as its parent. The parent can be a part of another row in the table, which will then be known as the parent's parent row. Continuing this way, the rule specifies that at the end there should be only one independent parent or root row. Such a characteristic is commonly found in most financial tables, including in financial statements. Rules 32, 33 and 34 specify further validation constraints on the final row. Rule 32 states that the final row should be checked to ascertain whether it 'contains' the text 'STOCKHOLDER', and specifies that if that condition is satisfied, the validation step should 'continue'. In other words, the mere containment of the text 'STOCKHOLDER' is a necessity, but not a sufficient condition for concluding the validation step. The third rule states that the final row should be checked to confirm whether it contains the text 'EQUITY'.

If it does, the rule specifies that the validation step can be concluded. Similarly, the fourth rule states that the final row should be checked to determine whether it contains the text 'CAPITAL', and if it does, the validation step may be concluded. The fifth rule specifies that no rows in the table can be left unprocessed. This implies that every row in the table has to be part of the hierarchical structure.

The process of discovering the hierarchical structure of the table and the imposition of validation rules around the hierarchical structure ensure that the correct table has been extracted. If the table of interest does not have any hierarchical structure, the step of discovering the hierarchical structure can be omitted and validation rules can be specified on the content of the table.

Optionally the document may be tagged at the identification step. A hyperlink is inserted if the identification step is successful. Even if the rest of the identification step is not successful, tagging at this stage will assist the analysts if the identification fails for all identification rules The extracted data can be saved into a RDBMS and constitute the first level of structured data. In the case of financials, this level of structuring will provide 'as reported' financial data.

Interpretation

Figure 15:
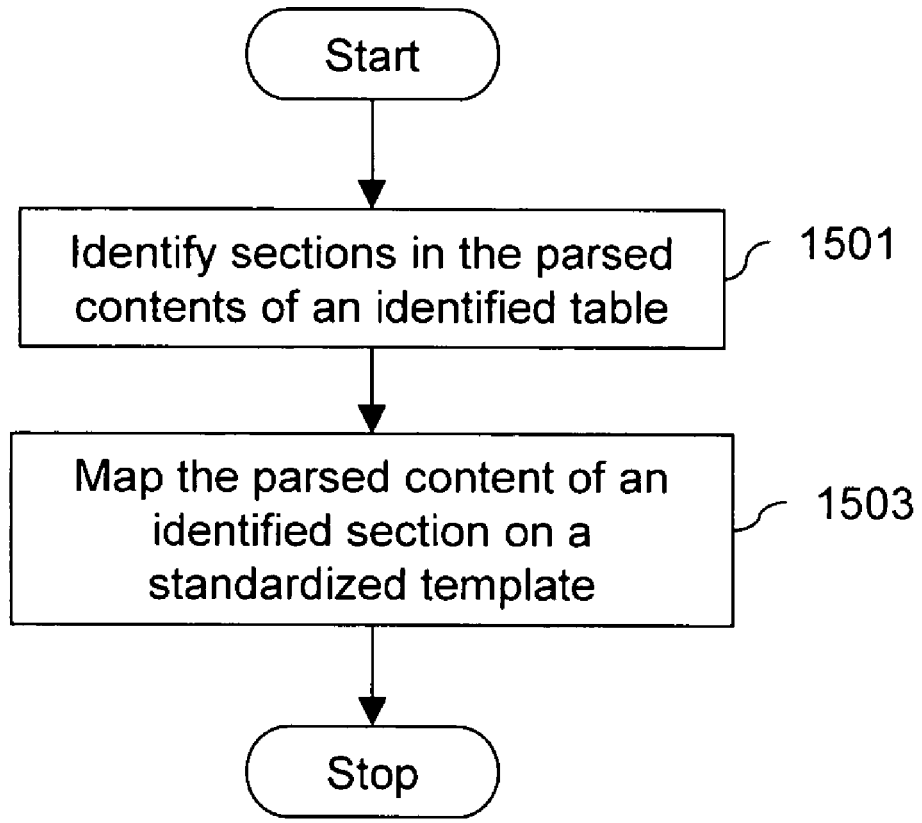
FIG. 15 is a flowchart illustrating a method of interpreting the tokenized content of a table, in accordance with an embodiment of the present invention.

FIG. 15 is a flowchart illustrating a method of interpreting the tokenized content of a table, in accordance with an embodiment of the present invention.

At step 1501, different sections are identified within the parsed content of the identified table. The parsed content is divided into sections before interpreting/standardizing it, in order to make the interpretation process less time-consuming and more accurate. Parsed contents are divided into sections, using a set of section identification rules and/or the hierarchical structure discovered during the extraction process.

For example, a generic section identification rule set may comprise the following rules:

36 'KEYSECTION' 'BALANCE SHEET' 'CURRENTASSETS START' 'ASSETS' 'EQUALS'
37 'KEYSECTION' 'BALANCE SHEET' 'CURRENTASSETS START' 'CURRENT ASSET' 'STARTSWITH'
38 'KEYSECTION' 'BALANCE SHEET' 'CURRENTASSETS START' 'CASH AND CASH' 'STARTSWITH'
39 'KEYSECTION' 'BALANCE SHEET' 'CURRENTASSETS END' 'TOTAL CURRENT ASSET' 'STARTSWITH'

Rule 36 states that if an item is found to equal the text 'ASSETS', it can be construed to be a positive identification of 'CURRENTASSETS START'. Rules 37 and 38 are alternative rules for identification of 'CURRENTASSETS START'. Rule 39 states that if an item is found to start with the text 'TOTAL CURRENT ASSETS', it can be construed to be a positive identification of 'CURRENTASSETS END'. Any two identifiers can denote a section. In the example above, 'CURRENTASSETS START' and 'CURRENTASSETS END' denote the start and end of the CURRENT ASSETS section in a Balance Sheet.

At step 1503, the parsed content of an identified section is interpreted by mapping it onto a standardized template, using a set of interpreting rules. The interpretation rules may be specific to a company or generic to the industry to which the company belongs. Generic interpretation rules are based on items that are usually encountered in the documents of an industry. Company specific interpretation rules are based on the items that are always present in the documents of a company.

In the case of financial statements, a company's reported financial statements will need to be interpreted against a standard financial statement for a class of companies, say, 'Industrials'.

The first column of an exemplary specific table interpretation rule set specifies the label of the identified table, the second column specifies the text descriptor to be searched for in the parsed table, the third column specifies the grammar to be applied, the fourth column specifies the name of the standardized table onto which the identified table is mapped, and the fifth column specifies the operation to be performed after mapping.

For example, a generic interpretation rule set may comprise the following rules:

40 'CURRENT ASSETS' 'CASH' 'STARTSWITH' 'CASH AND CASH EQUIVALENTS' 'ADD'
41 'CURRENT ASSETS' 'DEPOSITS' 'EQUALS' 'CASH AND CASH EQUIVALENTS' 'ADD'

Rule 40, an exemplary specific table interpretation rule states that if the text descriptor 'CASH' is encountered in an identified section labeled as 'CURRENT ASSETS', the value associated with the text descriptor should be added to a standardized field labeled as 'CASH AND CASH EQUIVALENTS'. The grammar 'STARTSWITH' specifies that a row in the identified table should start with the text descriptor 'CASH', to satisfy the first exemplary specific table interpretation rule. The grammar 'EQUALS' in Rule 41, another exemplary specific table interpretation rule, specifies that a row in the identified table should be equal to (i.e., should contain) only the text descriptor 'CASH', to satisfy the second exemplary specific table interpretation rule.

Standardization

The process of standardization will produce a structured financial statement. Once the table items are interpreted into a standard set of items as per a specified format, the interpretations can be summarized into the standard format and saved in a RDBMS in the standard format. The process of standardization involves the aggregation of the interpreted data and other logic that may be specific to the standardization requirements. In the case of some tables, such as financial statements, there is the additional need to standardize the sign representation of the numeric data. Different companies will report similar line items with dissimilar sign representation. For example, one company may represent 'Total Operating Expenses' as a positive number, and the statement's hierarchical structure will reflect an implicit sign with respect to how 'Total Operating Expenses' is included. For example, while representing 'Total Operating Expenses' as a positive number, 'Operating Income' will be represented as 'Total Revenue' minus 'Total Operating Expenses'. In this case, the implicit sign for 'Total Operating Expenses' in the hierarchical structure is 'negative', i.e., 'Total Operating Expenses' is being deducted from 'Total Revenue'. However, another company may represent 'Total Operating Expenses' as a negative number and 'Operating Income' as 'Total Revenue' plus 'Total Operating Expenses'. The process of standardization has to standardize the sign representation so that the hierarchical structure and integrity of the statement is preserved, as structured into the standard format.

Source Link

While the process of structuring and standardizing data from unstructured documents creates actionable information, an important requirement in the process is to preserve an audit trail between the various stages of the process, so that the end user can easily return from any stage of the process back to the source document. The current invention provides a method and system for preserving a complete audit trail throughout the structuring process. As the process goes through the various stages of the structuring cycle, the current invention creates and saves the audit trail. This involves two steps:

- Creating an enhanced version of the original unstructured document, which has embedded links for each element of data that has been extracted and structured
- Saving the reference to the links in the RDBMS, along with the extracted and structured data, so that audit trail functionality can be provided in any software application by using the references and the enhanced document Development of Rules The current invention relies on a system of rules and patterns to automate the structuring of data from unstructured documents. These rules can be broadly divided into three categories, namely:

- A generic rule set, used for identifying tables in documents for which no prior information is available
- A specific rule set, used for identifying tables in documents with known features such as known format or content
- A specific rule set, used for identifying tables in documents originating from a particular organization These rules are processed as meta data and are stored in the database. Details of processing and saving the rules as meta data are provided in the co-pending patent application Ser. No. 10/336,965, titled 'Business Process Technology for the Enterprise'. Rage Frameworks, Inc. filed this patent application on 6 Jan. 2003; the disclosure of which is hereby incorporated by reference.

The rule structure allows a combination of text labels, grammatical constraints on the text labels, a number of distinct words, and operations on numeric values to be used to identify, extract, interpret and standardize. Examples of grammatical constraints used include 'STARTSWITH', 'DOES NOT START WITH', 'CONTAINS', 'ENDSWITH', 'IN LOWERCASE', 'NOT IN LOWERCASE', 'IN UPPERCASE', 'NOT IN UPPERCASE', etc. Table identification, parsing, and interpretation rules, along with the grammatical constraints, are artificial intelligence-based learning rules and are developed on the basis of a sample document set. Therefore, the invention learns from the first time a document is processed and the rule sets are enhanced. Next, the enhanced rule sets are automatically applied, the next time a document (from the same source as the sample document set) is processed. Moreover, these rule sets are processed as meta data and stored in database 315. The stored meta data is read by engine 311 and processed as per requirement. Therefore, rule sets can be added, modified or deleted in database 315 at any time, without affecting the performance of system 300.

Identification Rules

The table is identified by using a set of table identification rules. These rules are formulated after considering various issues related to the identification of a table in a document. For example, some of these issues may be as follows:

- The order and location of table tags can be different for documents originating from different sources. Therefore, it is difficult to generalize the detection of the beginning and end of a table.
- The same table can have a large set of different semantic descriptions, for example, a 'Balance Sheet' can be referred to as a 'Consolidated Statement of Financial Position', 'Consolidated Balance Sheets', etc. Therefore, it is difficult to develop table identification rules based on table titles.
- In addition, the descriptions can occur multiple times throughout the document. Therefore, a table identification rule, based on table descriptions, can result in an erroneous identification of a table beginning or ending.
- In some cases, there can be multiple valid instances of the table in the document; and these instances may need to be merged into a single table that intelligently matches the lines in the multiple instances.

Table identification rules are developed after considering all the issues mentioned above, as well as any other issue that relates to the identification of a table in a document.

Extraction Rules

A table is tokenized or parsed by using a set of parsing rules. Parsing rules are formulated after considering various issues related to the content of the identified table. The following are some of these issues:

- The table content may not have a consistent separator between text labels and numbers. Therefore, it is difficult to formulate parsing rules to accurately tokenize text and numbers separately in a line.
- The number columns in the table may not be of uniform length. Therefore, formulating parsing rules for the detection and association of a numeric value with the correct section of the table is challenging.
- The text content of the table may have trailing characters, which make them similar to numbers. For example, text labels in financial statements are sometimes trailed by ' . . . ', which trail up to the numeric value for that line item. Therefore, in such cases, it is difficult to develop parsing rules to separate the text and numeric value consistently.
- At times, there may be certain unprintable characters included within the text content of the table. Therefore, parsing rules need to be developed, taking into account such unprintable characters.
- The table content may have no uniform presentation style, for example, '10Q' SEC filing documents sometimes have the entire data presented side by side, while at other times they may have three-month and six-month statements, separated and presented one below the other. Therefore, parsing rules need to be developed, taking into account different presentation styles.

Parsing rules are formulated after considering all issues mentioned above, as well as any other issues that relate to the tokenization of the content of an identified table.

Interpretation Rules

Tokens are interpreted by using a set of interpretation or mapping rules. These interpretation rules are developed by considering various issues related to the size and characteristics of the tokens. Some of these issues may be as follows:

- Identical text descriptions may occur in different sections of an identified table. For example, the word 'other' can occur in many places in a financial statement. Therefore, it is difficult to separate text and value tokens consistently across the length of the table.
- An identical text descriptor may be a header in one table and a valid line item in another. Therefore, it is difficult to interpret text tokens on the basis of their text descriptions.
- Headers may run across multiple lines of an identified table. Therefore, it is difficult to develop standard interpretation rules, based on table headers.

Line item descriptions may also run across multiple lines of an identified table. Therefore, it is difficult to interpret the tokens on a line-by-line basis.

The process of interpretation involves arranging the tokenized content of the identified table into different sections and then mapping the tokens in a section onto a standard template. Interpretation of tokens is performed by using interpretation rules. An initial set of interpretation rules are developed for token interpretation/mapping, based on the patterns found in a few instances of a document set.

Standardization Rules

Standardization rules are normally simple aggregation rules that aggregate the line items according to the interpreted map. In some cases, an important aspect of the standardization is to standardize the sign of the number in the table across many instances of the document. This is required where the same line item can be represented with opposite signs in two different instances of the document. For example, in the case of financial statements, some companies may report 'Interest Expense' as a positive number and others may report it as a negative number. Sign standardization is achieved by developing an appropriate set of sign standardization rules. Developing sign standardization rules involves a three-way analysis of the implicit signs used at the time of normalization, the signs of the numbers, and the implicit signs used in the document. For example, if a normalized item is subtracted to reach a sub-total in a financial statement, and that item is reported as a negative number in the document and the document adds that item to reach the sub-total reported in the document, the sign needs to be reversed during the standardization process.

Computer System

The system and method, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing steps constituting the method of the present invention.

The computer system comprises a computer, an input device, a display unit, and the Internet. The computer comprises a microprocessor, which is connected to a communication bus. The computer also includes a memory, which may include Random Access Memory (RAM) and Read Only Memory (ROM). The computer system further comprises a storage device, which can be a hard disk drive or a removable storage drive such as a floppy disk drive, optical disk drive, etc. The storage device can also be other similar means for loading computer programs or other instructions into the computer system.

The computer system executes a set of instructions that is stored in one or more storage elements, to process input data. The storage elements may hold data or other information, as desired. They may be in the form of an information source or a physical memory element present in the processing machine.

The set of instructions may include various commands that instruct the processing machine to perform specific tasks, such as the steps that constitute the method of the present invention. The set of instructions may be in the form of a software program. The software may be in various forms, such as system software or application software. Further, the software may be in the form of a collection of separate programs, a program module with a larger program, or a portion of a program module. The software may also include modular programming in the form of object-oriented programming. Specifically, the modules of the semi-automatic converter may be coded a high-level language such as, for example, C, C++ and JAVA. The processing of input data by the processing machine may be in response to user commands, to results of previous processing, or to a request made by another processing machine.

Therefore, the present invention provides the advantage of being an artificial intelligence-based, robust and flexible application that substantially automates the retrieval, extraction, interpretation, standardization and validation of tabular data from unstructured documents.

The present invention may also be embodied in computer program product for use with a computer. The computer program product includes a computer readable medium having a computer readable program code embodied therein.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A computer program product for use with a computer, the computer program product comprising a computer usable medium having a computer readable program code embodied therein for automating a process of structuring the tabular data from unstructured documents, the unstructured documents comprising tabular and non-tabular data, the structuring of the tabular data from the unstructured documents being performed by accessing and processing a plurality of rules without programming of the plurality of rules, the rules being modeled as meta-data and stored as the meta-data in a database to provide flexibility of adding and modifying the rules, the computer program product comprising:

a. program instruction means for identifying a table of interest from the tabular and non-tabular data in an unstructured document by processing a set of table identification rules without programming the set of table identification rules, the set of table identification rules being based on semantic descriptions, format, structure, grammar and content of the tabular and non-tabular data in the unstructured document;

b. program instruction means for confirming the identified table by processing a set of table confirmation rules without programming the set of table confirmation rules, the set of table confirmation rules being used to verify that the identified table is a table of interest;

c. program instruction means for tokenizing the content of the identified table into tokens by processing a set of parsing rules without programming the set of parsing rules;

d. program instruction means for interpreting the tokenized content of the identified table, the tokenized content being interpreted with reference to a standardized template including a standardized set of data fields, the program instruction means for interpreting the tokenized content comprises program instruction means for:

i. arranging the tokenized content of the identified table into one or more sections by processing a set of section identification rules without programming the set of section identification rules; and ii. mapping the tokenized content of each of the one or more sections onto the standardized set of data fields, by processing a set of interpretation rules without programming the set of interpretation rules;

e. program instruction means for standardizing the interpreted content of the identified table by processing a set of standardization rules without programming the set of standardization rules, wherein the program instruction means for standardizing of the interpreted content comprises program instruction means for:
  i. aggregating the mapped tokenized content of the interpreted content of the identified table; and
  ii. standardizing sign representation for numeric data of the interpreted content by processing a set of sign standardization rules without programming the set of sign standardization rules, the sign representation being standardized when different instances of the same token of the interpreted content of the identified table being represented with opposite signs;
f. program instruction means for providing hyperlinks between the unstructured document and one or more steps of the process of structuring the tabular data, the one or more steps of the process of structuring of the tabular data comprise identifying the table, confirming the identified table, tokenizing the content of the identified table, interpreting the tokenized content, and standardizing the interpreted content, the hyperlinks being provided to enable a user to navigate back to the unstructured document from the one or more steps; and
g. program instruction means for outputting the standardized table through a user interface.

2. The computer program product according to claim 1, wherein the program instruction means for identifying the table includes program instruction means for merging multiple valid instances of the table into a single table by matching lines in the multiple valid instances.

3. The computer program product according to claim 1, wherein the program instruction means for tokenizing the content of the identified table comprises program instruction means for:
  a. filtering the content of the identified table to remove invalid data by processing a set of invalid data rules without programming the set of invalid data rules;
  b. parsing the filtered content line by line by processing the set of parsing rules; and
  c. validating the parsed content by processing a set of validation rules without programming the set of validation rules, the set of validation rules being used to verify accuracy of the parsed content, the validating of the parsed content being performed to eliminate erroneous parsing of the content of the identified table.

4. The computer program product according to claim 3, wherein the program instruction means for validating the parsed content comprises program instruction means for discovering a hierarchical mathematical structure of the identified table, the hierarchical mathematical structure being used with the set of validation rules to verify the accuracy of the parsed content.

5. The computer program product according to claim 1, wherein the set of table confirmation rules detect and validate the content of the identified table, end of the identified table, and neighborhood around beginning of the identified table.

6. The computer program product according to claim 1 further comprising:
  a. program instruction means for storing the hyperlinks in a relational database management system (RDBMS), the RDBMS being used to store the structured tabular data; and
  b. program instruction means for creating a new version of the unstructured document, the new version of the unstructured document comprising embedded hyperlinks for each element of data being extracted and structured in the one or more steps.

7. A computer program product for use with a computer, the computer program product comprising a computer usable medium having a computer readable program code embodied therein for automating a process of structuring tabular data from unstructured documents, the unstructured documents comprising tabular and non-tabular data, the structuring of tabular data from the unstructured documents being performed by accessing and processing a plurality of rules without programming of the plurality of rules, the rules being modeled as meta-data and stored as the meta-data in a database to provide flexibility of adding and modifying the rules, the computer program product comprising:
a. program instruction means for identifying a table of interest from the tabular and non-tabular data in an unstructured document by processing a set of table identification rules without programming, the set of table identification rules being based on semantic descriptions, format, structure, grammar and content of the tabular and non-tabular data in the unstructured document, the program instruction means for identifying the table comprising:
  i. program instruction means for merging multiple valid instances of the table into a single table;
b. program instruction means for confirming the identified table by processing a set of table confirmation rules without programming the set of table confirmation rules, the set of table confirmation rules being used to verify that the identified table is a table of interest, the set of table confirmation rules being applied to eliminate erroneous identification of the identified table, the set of table confirmation rules detect and validate the content and end of the identified table, and the neighborhood around the beginning of the identified table;
c. program instruction means for tokenizing the content of the identified table by processing a set of parsing rules without programming the set of parsing rules, the identified table being tokenized into tokens on a line by line basis, the program instruction means for tokenizing of the content of the identified table comprises program instruction means for:
  i. filtering the content of the identified table to remove invalid data by processing a set of invalid data rules without programming the set of invalid data rules;
  ii. parsing the filtered content line by line by processing a the set of parsing rules; and
  iii. validating the parsed content by processing a set of validation rules without programming the set of validation rules, the set of validation rules being used to verify accuracy of the parsed content, the validating of the parsed content being performed to eliminate erroneous parsing of the content of the identified table;
d. program instruction means for interpreting the tokenized content of the identified table, the tokenized content being interpreted with reference to a standardized template including a standardized set of data fields, the program instruction means for interpreting of the tokenized content comprises program instruction means for:
  i. arranging the tokenized content of the identified table into one or more sections by processing a set of section identification rules without programming the set of section identification rules; and
  ii. mapping the tokenized content of each of the one or more sections onto the standardized set of data fields, by processing a set of interpretation rules without programming the set of interpretation rules;

e. program instruction means for standardizing the interpreted content by processing a set of standardization rules without programming the set of standardization rules, wherein the program instruction means for standardizing the interpreted content comprises program instruction means for:
   i. aggregating the mapped tokenized content of the interpreted content of the identified table; and
   ii. standardizing the sign representation for numeric data of the interpreted content by processing a set of sign standardization rules without programming the set of sign standardization rules, the sign representation being standardized when different instances of same token of the interpreted content of the identified table are represented with opposite signs;
f. program instruction means for providing hyperlinks between the unstructured document and one or more steps of the process of structuring the tabular data, the one or more steps of the process of structuring of the tabular data comprise identifying the table, confirming the identified table, tokenizing the content of the identified table, interpreting the tokenized content, and standardizing the interpreted content, the hyperlinks being provided to enable a user to navigate back to the unstructured document from the one or more steps; and
g. program instruction means for outputting the standardized table through a user interface.

8. The computer program product according to claim 7 further comprising:
   a. program instruction means for storing the hyperlinks in a relational database management system (RDBMS), the RDBMS being used to store the structured tabular data; and
   b. program instruction means for creating a new version of the unstructured document, the new version of the unstructured document comprising embedded hyperlinks for each element of data being extracted and structured in the one or more steps.

9. The computer program product according to claim 7, wherein the program instruction means for validating the parsed content comprises program instruction means for discovering a hierarchical mathematical structure of the identified table, the hierarchical mathematical structure being used with the set of validation rules to verify the accuracy of the parsed content.

10. A computer program product for use with a computer, the computer program product comprising a computer usable medium having a computer readable program code embodied therein for automating a process of structuring tabular data from unstructured documents, the unstructured documents comprising tabular and non-tabular data, the structuring of tabular data from the unstructured documents being performed by accessing and processing a plurality of rules without programming of the plurality of rules, the rules being modeled as meta-data and stored as the meta-data in a database to provide flexibility of adding and modifying the rules, the computer program product comprising:
   a. program instruction means for identifying a table of interest from the tabular and non-tabular data in an unstructured document by processing a set of table identification rules without programming, the set of table identification rules being based on different semantic descriptions, format, structure, grammar and content of the tabular and non-tabular data in the unstructured document, the program instruction means for identifying the table comprises program instruction means for:
      i. merging multiple valid instances of the table into a single table;
   b. program instruction means for confirming the identified table by processing a set of table confirmation rules without programming the set of table confirmation rules, the set of table confirmation rules being used to verify that the identified table is a table of interest, the set of table confirmation rules being applied to eliminate erroneous identification of the identified table, the set of table confirmation rules detect and validate the content and end of the identified table, and neighborhood around beginning of the identified table;
   c. program instruction means for tokenizing the content of the identified table by processing a set of parsing rules without programming the set of parsing rules, the identified table being tokenized into tokens on a line by line basis, the program instruction means for tokenizing the content of the identified table comprising:
      i. program instruction means for filtering the content of the identified table to remove invalid data by processing a set of invalid data rules without programming the set of invalid data rules;
      ii. program instruction means for parsing the filtered content line by line by processing the set of parsing rules without programming the set of parsing rules; and
      iii. program instruction means for validating the parsed content by processing a set of validation rules without programming the set of validation rules, the set of validation rules being used to verify the accuracy of the parsed content, the validating of the parsed content being performed to eliminate erroneous parsing of the content of the identified table;
   d. program instruction means for interpreting the tokenized content of the identified table, the tokenized content being interpreted with reference to a standardized template including a standardized set of data fields, the program instruction means for interpreting the tokenized content comprising:
      i. program instruction means for arranging the tokenized content of the identified table into one or more sections by processing a set of section identification rules without programming the set of section identification rules; and
      ii. program instruction means for mapping the tokenized content of each of the one or more sections onto the standardized set of data fields, by processing a set of interpretation rules without programming the set of interpretation rules;
   e. program instruction means for standardizing the interpreted content by processing processing a set of standardization rules without programming the set of standardization rules, wherein the program instruction means for standardizing the interpreted content comprising:
      i. program instruction means for aggregating the mapped tokenized content of the interpreted content of the identified table; and
      ii. program instruction means for standardizing the sign representation for numeric data of the interpreted content by processing using a set of sign standardization rules without programming the set of sian standardization rules, the sign representation being standardized when different instances of same token of the interpreted content of the identified table being represented with opposite signs;

f. program instruction means for providing a hyperlinks between the unstructured document and one or more steps of the process of structuring the tabular data, the one or more steps of the process of structuring of the tabular data include identifying the table, confirming the identified table, tokenizing the content of the identified table, interpreting the tokenized content, and standardizing the interpreted content, the hyperlinks being provided to enable a user to navigate back to the unstructured document from the one or more steps;

g. program instruction means for storing the hyperlinks in a relational database management system (RDBMS), the RDBMS being used to store the structured tabular data;

h. program instruction means for creating a new version of the unstructured document, the new version of the unstructured document comprising embedded hyperlinks for each element of data being extracted and structured in the one or more steps; and i. program instruction means for outputting the standardized table through a user interface.

11. A system for automating a process of structuring the tabular data from unstructured documents, the unstructured documents comprising tabular and non-tabular data, the structuring of tabular data from the unstructured documents being performed by accessing and processing a plurality of rules without programming of the plurality of rules, the rules being modeled as meta-data and stored as the meta-data in a database to provide flexibility of adding and modifying the rules, the system comprising:

a. a data layer, the data layer being used to identify a table of interest by processing a set of table identification rules without programming the set of table identification rules, tokenize the content by processing a set of parsing rules without programming the set of parsing rules, map the tokenized content onto a standardized set of data fields by processing a set of mapping rules without programming the set of mapping rules, the data layer comprising a database, the database being used to store the set of table identification, parsing and mapping rules; and b. a service layer, the service layer comprising a web server and an application server, the web server being used to access the unstructured documents, the application server comprises an engine to standardize a sign representation for numeric data of content of the tabular data by processing a set of sign standardization rules, the sign representation being standardized when different instances of the same token of the content of the identified table being represented with opposite signs;

c. a presentation layer, the presentation layer comprising:
 i. a user interface, the user interface being used to provide access to extracted, interpreted, and standardized data to a user; and
 ii. a relational database management system (RDBMS), the RDBMS being used to store the structured tabular data and hyperlinks between the unstructured documents and one or more steps of structuring the tabular data, the one or more steps include the identification of a table of interest, tokenizing the content and mapping the content, the hyperlinks being provided to enable a user to navigate back to the unstructured documents from the one or more steps.

12. The system according to claim 11, wherein the application server comprises:

a. the engine being used to perform extraction, interpretation of the tokenized content with reference to the standardized set of data fields by processing the set of identification and a set of interpretation rules, and standardization of the tabular data from the unstructured documents; and b. a data access layer, the data access layer being used as a gateway to the database and the RDBMS, the data access layer being used to access the set of table identification, parsing and mapping rules.

13. A method for automating a process of structuring the tabular data from unstructured documents, the unstructured documents comprising tabular and non-tabular data, the structuring of tabular data from the unstructured documents being performed by accessing and processing a plurality of rules without programming of the plurality of rules, the rules being modeled as meta-data and stored as the meta-data in a database to provide flexibility of adding and modifying the rules, the method comprising the steps of:

a. identifying a table of interest in an unstructured document by processing a set of table identification rules without programming the set of table identification rules, the set of table identification rules being based on semantic descriptions, format, structure, grammar and content of the tabular and non-tabular data in the unstructured document;

b. confirming the identified table by processing a set of table confirmation rules without programming the set of table confirmation rules, the set of table confirmation rules being used to verify that the identified table is a table of interest;

c. tokenizing the content of the identified table into tokens by processing a set of parsing rules without programming the set of parsing rules;

d. interpreting the tokenized content of the identified table, the tokenized content being interpreted with reference to a standardized template including a standardized set of data fields, the interpreting the tokenized content comprises the steps of:
 i. arranging the tokenized content of the identified table into one or more sections by processing a set of section identification rules without programming the set of section identification rules; and
 ii. mapping the tokenized content of each of the one or more sections onto the standardized set of data fields, by processing a set of interpretation rules without programming the set of interpretation rules;

e. standardizing the interpreted content of the table by processing a set of standardization rules without programming the set of standardization rules, wherein the standardizing of the interpreted content comprises the steps of:
 i. aggregating the mapped tokenized content of the interpreted content of the identified table; and
 ii. standardizing the sign representation for numeric data of the interpreted content by processing a set of sign standardization rules without programming the set of sign standardization rules, the sign representation being standardized when different instances of same token of the interpreted content of the identified table being represented with opposite signs;

f. providing hyperlinks between the unstructured document and one or more steps of the process of structuring the tabular data, the one or more steps of the process of structuring of the tabular data comprise identifying the table, confirming the identified table, tokenizing the content of the identified table, interpreting the tokenized content, and standardizing the interpreted content, the hyperlinks being provided to enable a user to navigate back to the unstructured document from the one or more steps; and g. outputting the standardized table through a user interface.

14. A method for automating a process of structuring tabular data from unstructured documents, the unstructured documents comprising tabular and non-tabular data, the structuring of tabular data from the unstructured documents being performed by accessing and processing a plurality of rules without programming of the plurality of rules, the rules being modeled as meta-data and stored as the meta-data in a database to provide flexibility of adding and modifying the rules, the method comprising the steps of:

a. identifying a table of interest in an unstructured document by processing a set of table identification rules without programming the set of table identification rules, the set of table identification rules being based on semantic descriptions, format, structure, grammar and content of the tabular and non-tabular data in the unstructured document, the identifying of the table comprising:
      i. merging multiple valid instances of the table into a single table;
   b. confirming the identified table by processing a set of table confirmation rules without programming the set of table confirmation rules, the set of table confirmation rules being used to verify that the identified table is a table of interest, the set of table confirmation rules being applied to eliminate erroneous identification of the identified table, the set of table confirmation rules detect and validate the content and end of the identified table, and neighborhood around beginning of the identified table;
   c. tokenizing the content of the identified table by processing using a set of parsing rules without programming the set of parsing rules, the identified table being tokenized into tokens on a line by line basis, the tokenizing of the content of the identified table comprising:
      i. filtering the content of the identified table to remove invalid data by processing a set of invalid data rules without programming the set of invalid data rules;
      ii. parsing the filtered content line by line by processing the set of parsing rules; and
      iii. validating the parsed content by processing a set of validation rules without programming the set of invalidation rules, the set of validation rules being used to verify the accuracy of the parsed content, the validating of the parsed content being performed to eliminate erroneous parsing of the content of the identified table;
   d. interpreting the tokenized content of the identified table, the tokenized content being interpreted with reference to a standardized template including standardized set of data fields, the interpreting of the tokenized content comprising:
      i. arranging the tokenized content of the identified table into one or more sections by processing a set of section identification rules; and
      ii. mapping the tokenized content of each of the one or more sections onto the standardized set of data fields, by processing a set of interpretation rules without programming the set of interpretation rules;
   e. standardizing the interpreted content by processing a set of standardization rules without programming the set of standardization rules, wherein the standardizing the interpreted content comprising:
      i. aggregating the mapped tokenized content of the interpreted content of the identified table; and
      ii. standardizing the sign representation for numeric data of the interpreted content by processing a set of sign standardization rules, the sign representation being standardized when different instances of same token of interpreted content of the identified table being represented with opposite signs; and
   f. outputting the standardized table through a user interface.

* * * * *